(12) United States Patent
Hirotani et al.

(10) Patent No.: US 7,121,611 B2
(45) Date of Patent: Oct. 17, 2006

(54) ARMREST STRUCTURE FOR VEHICLE

(75) Inventors: Yasunari Hirotani, Hiroshima (JP);
Shingo Kunihiro, Hiroshima (JP);
Keiji Sekimoto, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 56 days.

(21) Appl. No.: 10/863,201

(22) Filed: Jun. 9, 2004

(65) Prior Publication Data
US 2005/0023861 A1    Feb. 3, 2005

(30) Foreign Application Priority Data

Jul. 29, 2003 (JP) ............................ 2003-281414
Aug. 1, 2003 (JP) ............................ 2003-284646
Aug. 22, 2003 (JP) ............................ 2003-298583

(51) Int. Cl.
*B60R 21/04*    (2006.01)

(52) U.S. Cl. .............. 296/146.7; 296/153; 296/187.05; 280/751

(58) Field of Classification Search ............. 296/146.7, 296/153, 187.05; 280/751
See application file for complete search history.

(56) References Cited

U.S. PATENT DOCUMENTS 5,181,759 A * 1/1993 Doolittle ..................... 296/153
5,527,084 A * 6/1996 Scherf ......................... 296/153
5,542,738 A * 8/1996 Walker et al. ........... 296/187.05
5,749,600 A * 5/1998 Yamada et al. ............... 280/751

FOREIGN PATENT DOCUMENTS

| EP | 0-315-322 A2 | 5/1989 |
| EP | 0-315-322 A3 | 5/1989 |
| JP | 2002-04-6520 A | 2/2002 |
| JP | 2002-046520 | 2/2002 |
| JP | 2002-046521 | 2/2002 |

* cited by examiner

Primary Examiner—Joseph D. Pape
(74) Attorney, Agent, or Firm—Nixon Peabody LLP; Donald R. Strudebaker

(57) ABSTRACT

A structure of an armrest protruding and extending toward a passenger from an inside wall of a vehicle compartment, comprises a trim body portion covering the inside wall, an armrest face portion extending in a substantially horizontal direction from the trim body portion toward an inside, and a support face portion extending continuously from the armrest face portion downward. There is provided a weak portion (deformation promoting portion) between the trim body portion and the armrest face portion to promote deformation with respect to a lateral load. Further, there is provided a garnish covering the weak portion from the vehicle compartment. Accordingly, both sufficient resistance of the armrest in use for the load applied in the vertical direction and proper impact-absorption function of the armrest during the vehicle side collision can be obtained.

9 Claims, 26 Drawing Sheets

ARMREST STRUCTURE FOR VEHICLE

BACKGROUND OF THE INVENTION

The present invention relates to an armrest structure for a vehicle in which an armrest is disposed so as to protrude and extend toward a passenger from an inside wall of a vehicle compartment.

Generally, the armrest of the vehicle protrudes from the inside wall of the vehicle compartment toward an inside of the vehicle compartment, and it has sufficient rigidity to sustain a load applied thereto in a vertical direction because a passenger put its armrest on the armrest.

It has been required that such armrest has its structure that would not give an improper impact to the passenger during a side collision of the vehicle. Thus, conventionally, some structures to absorb such impact of the armrest have been invented.

In one of conventional armrest structures for the vehicle illustrated in FIG. 24 (see, for example, Japanese Laid-Open Patent Publication No. 2002-46520), a boss 684 for attaching an armrest lower 683 is fixed to a door trim 681 by a screw 682, and there is provided an armrest upper 685 above the armrest lower 683. Further, there are provided ribs 687, 688 respectively on an upper face of a horizontal piece 686 of the armrest lower 683 and a lower face of an armrest portion of the armrest upper 685, and slant faces 687a, 688a formed at each facing portion of these ribs 687, 688 are contacted to each other.

The armrest, whose normal state is illustrated in FIG. 24, absorbs the impact load when the side-collision load is applied to the vehicle in such a manner that the slant face 688a of the rib 687 of the armrest upper 685 slides along the slant face 687a of the rib 687 of the armrest lower 683, and thus the armrest upper 685 pops up and deform, as illustrated in FIGS. 24 and 25.

The above-described conventional structure, however, had a problem of a poor appearance from the inside of a vehicle compartment. Namely, as illustrated in FIG. 24, a lower end portion at the side of vehicle compartment of the armrest upper 685 hangs over an upper end portion at the side of the vehicle compartment of the armrest lower 683, thereby providing a difference in level between them (see an arrow α portion).

Further, at least the horizontal potion 686 remains in the same shape as that in its normal state as illustrated in FIG. 25 at the time of its impact load absorption during the side vehicle collision. Accordingly, there was a problem that a sufficient load absorption could not be obtained.

In addition, since the armrest is divided into two parts by respective slant faces 688a, 687a in its normal state as shown in FIG. 24, there was a problem that the armrest could not provide sufficient rigidity with respect to a load occurring in a vertical direction.

Meanwhile, in another armrest structure for a vehicle illustrated in FIG. 26 (see, for example, Japanese Laid-Open Patent Publication No. 2002-46521), a boss 695 for attaching an armrest lower 694 is fixed by a screw 693 provided in an attaching hole 692 of a door trim 691, and a boss 100 for attaching an armrest upper 699 is fixed by a clip 697 and a screw 698.

In this conventional armrest structure for the vehicle of FIG. 26, the impact load, when the side-collision load is applied to the vehicle, is absorbed in the following manner. Namely, according to a contact of the passenger and the armrest 694 due to the vehicle collision, the boss 695 is moved from an elongate hole portion to a large hole portion of the attaching hole 692, so that the boss 695 itself deforms such that its base portion (at an vehicle inside) moves forward and a head portion (at a vehicle outside) of the screw 693 moves backward. This allows the armrest lower 694 to deform resiliently and/or break, thereby absorbing the impact load.

The above-described conventional structure, however, had the same problem of poor appearance from the inside of the vehicle compartment as the above. Because, as illustrated in FIG. 26, a lower end portion at the side of vehicle compartment of the armrest upper 699 hangs over an upper end portion at the side of the vehicle compartment of the armrest lower 694, thereby providing a difference in level between them (see an arrow β portion). Additionally, since at least the horizontal potion 696 remains in the same shape as that in its normal state as illustrated in FIG. 26 at the time of its impact load absorption during the side vehicle collision, there was a problem that a sufficient load absorption could not be obtained.

SUMMARY OF THE INVENTION

The present invention has been devised in view of the above-described problems, and an object of the present invention is to provide an armrest structure for a vehicle that can maintain a proper impact-absorption function during the vehicle side collision, and thus can provide both sufficient resistance for a load applied to the armrest in a vertical direction and the proper impact-absorption function.

The object is achieved by an armrest structure for a vehicle of the present invention according to claim 1. Preferred embodiments of armrest structures for a vehicle according to the present invention are subjects of the dependent claims.

According to the present invention, there is provided an armrest structure for a vehicle, in which an armrest is disposed so as to protrude and extend toward a passenger from an inside wall of a vehicle compartment, comprising a trim body portion covering the inside wall of the vehicle compartment, an armrest face portion extending in a substantially horizontal direction from the trim body portion toward an inside of the vehicle compartment, a support face portion extending continuously from the armrest face portion downward, and a deformation promoting portion which is provided at and/or near the armrest face portion of the armrest so as to promote a deformation of the armrest with respect to a load which is applied to the armrest in a vehicle width direction.

Accordingly, the proper impact-absorption function during the vehicle side collision can be obtained by the above-described deformation promoting portion, and thus both sufficient resistance for the load applied to the armrest in the vertical direction and the proper impact-absorption function can be obtained.

According to a preferred embodiment, the above-described deformation promoting portion is configured of a weak portion which is formed at the armrest between the trim body portion and the armrest face portion so as to promote the deformation of the armrest with respect to the load which is applied to the armrest in the vehicle width direction, and there is provided a garnish covering the weak portion from the inside of the vehicle compartment.

Accordingly, since the weak portion is covered by the garnish during the use of the armrest, a good appearance of the armrest when viewed from the inside of the vehicle compartment can be provided by the garnish, along with maintaining sufficient rigidity and load resistance of the armrest in the vertical direction. Further, since the weak portion which promotes the deformation of the armrest easily yields to a vehicle-width-direction load occurring during the vehicle side collision, the proper impact absorption function of the armrest can be obtained. Namely, both the sufficient resistance for the load applied to the armrest in the vertical direction and the proper impact-absorption function can be obtained.

According to another preferred embodiment, the weak portion comprises an opening which extends in a longitudinal direction of the vehicle, and the garnish is provided so as to extend along the opening and cover the opening.

Accordingly, strength of the armrest is properly adjusted and designed by the opening, and thus controlling the impact absorption function with respect to the side-collision load can be facilitated. Also, the garnish can be easily attached to the armrest by the use of the opening without any other particular attaching materials such as adhesive or the like.

According to another preferred embodiment, the garnish is configured so as to be detached from the weak portion when the load applied is greater than a specified load.

Accordingly, since the garnish is properly detached from the weak portion by the greater side-collision load, the proper impact absorption function can be obtained without any prevention by the garnish. The good appearance of the armrest in use when viewed from the inside of the vehicle compartment can be also obtained by the garnish. Accordingly, both the good appearance and the proper impact absorption can be obtained.

According to another preferred embodiment, there is further provided a weak portion to promote the deformation of the armrest with respect to the load at part of the support face portion of the armrest, and there is provided a garnish covering the weak portion from the inside of the vehicle compartment.

Accordingly, since the weak portion is covered by the garnish during the use of the armrest, a good appearance of the armrest when viewed from the inside of the vehicle compartment can be provided by the garnish, along with maintaining sufficient rigidity and load resistance of the armrest in the vertical direction. Further, since the weak portion at the support face portion also yields to the side-collision load in addition to the weak portion formed between the trim body portion and the armrest face portion, the impact absorption function can be further improved. Namely, sufficient vertical-direction rigidity can be maintained by the attached garnish, and also further proper decreasing in a strength of the armrest in the vehicle width direction can be obtained by the use of the both weak portions (the weak portion provided between the trim body portion and the armrest face portion, and the weak portion at the support face portion), thereby improving the impact absorption.

According to another preferred embodiment, the weak portion provided at the support face portion comprises an opening which extends in a longitudinal direction of the vehicle, and the garnish is provided so as to extend along the opening and cover the opening.

Accordingly, strength of the armrest is properly adjusted and designed by the opening, and thus controlling the impact absorption function to the side-collision load can be facilitated. Also, the garnish can be easily attached to the armrest by the use of the opening without any other particular attaching materials such as adhesive or the like.

According to another preferred embodiment, the garnish is configured so as to be detached from the weak portion when the load applied is greater than a specified load.

Accordingly, since the garnish is properly detached from the weak portion by the greater side-collision load, the proper impact absorption function can be obtained without any prevention by the garnish. The good appearance of the armrest in use when viewed from the inside of the vehicle compartment can be also obtained by the garnish. Accordingly, both the good appearance and the proper impact absorption can be obtained.

According to another preferred embodiment, there is provided a weak portion to promote the deformation of the armrest with respect to the load at part of the support face portion of the armrest, and there is provided a garnish covering the weak portion from the inside of the vehicle compartment.

Accordingly, since the weak portion is covered by the garnish during the use of the armrest, a good appearance of the armrest when viewed from the inside of the vehicle compartment can be provided by the garnish, along with maintaining sufficient rigidity and load resistance of the armrest in the vertical direction. Further, since the weak portion which promotes the deformation of the armrest easily yields to the vehicle-width-direction load occurring during the vehicle side collision, the impact absorption function can be improved. Namely, both the sufficient resistance for the load applied to the armrest in the vertical direction and the proper impact-absorption function can be obtained.

According to another preferred embodiment, the armrest is formed at a door trim of a side door of the vehicle.

Accordingly, since the armrest structure according to the present invention is applied to the side door of the vehicle which tends to be pushed into the vehicle compartment during the vehicle side collision, the impact absorption function can be attained preferably.

According to another preferred embodiment, there is provided an impact absorbing member at an outside of the trim body portion. The impact absorbing member may be configured of an impact absorbing pad.

Accordingly, in the event that the garnish is detached from the weak portion due to the side vehicle collision and then the door trim hits the passenger, an impact which may be applied to the passenger can be absorbed preferably by the impact absorbing member.

According to another preferred embodiment, there is further provided an impact absorbing member at an outside of the support face portion. The impact absorbing member may be configured of an impact absorbing pad.

Accordingly, since impact absorbing members are provided separately above and below the armrest face portion of the armrest, the impact which may be applied to the passenger after the garnish is detached from the weak portion and the armrest face potion deforms can be absorbed efficiently by the both absorbing members.

According to another preferred embodiment, the deformation promoting portion is configured of a weak portion which is formed at the armrest face portion so as to promote the deformation of the armrest with respect to the load which is applied to the armrest in the vehicle width direction, and a separate armrest body is attached to the armrest face portion so as to cover the weak portion at its side of the inside of the vehicle compartment.

Accordingly, the sufficient vertical-direction load resistance of the armrest in use can be obtained by rigidity of the separate armrest body and the support face portion. Further, since the weak portion which deforms due to the vehicle-width-direction load is provided at the armrest face portion, the proper impact-absorption function can be obtained by the deformation of the weak portion during the vehicle side collision. Also, since the weak portion is covered by the separate armrest body at the side of the vehicle compartment, good appearance when viewed from the inside of the vehicle compartment can be provided.

According to another preferred embodiment, a first opening is formed at the armrest face portion so as to extend in a longitudinal direction of the vehicle. Namely, the above-described weak portion is configured of the first opening.

Accordingly, strength of the armrest is properly adjusted and designed by the first opening, and thus controlling the impact absorption function with respect to the side-collision load can be facilitated, and a degree of the impact absorption can be increased by setting an opening area of the first opening properly.

According to another preferred embodiment, the first opening is configured of plural holes.

Accordingly, since the first opening is configured of plural holes, the adjustment of strength, particularly with respect to the impact load, can be facilitated.

According to another preferred embodiment, a second opening is formed at the armrest between the armrest face portion and the support face portion so as to extend in the a longitudinal direction of the vehicle.

Accordingly, since the first and second opening are provided, the rigidity in the vehicle width direction can be further decreased. As a result, the armrest face portion can be configured so as to yield easily to the side-collision load, thereby improving the impact absorption function.

According to another preferred embodiment, the second opening is configured of plural holes.

Accordingly, since the second opening is configured of plural holes, the adjustment of strength, particularly with respect to the impact load, can be facilitated.

According to another preferred embodiment, the armrest body is configured so as to be detached from the weak portion when the load applied is greater than a specified load.

Accordingly, since the armrest body is detached from the weak portion during the vehicle collision, the armrest face portion can deform easily, thereby obtaining the proper impact absorption function.

According to another preferred embodiment, the deformation promoting portion is configured of weak portions which are formed at the armrest between the armrest face portion and the support face portion and/or at the support face portion so as to promote the deformation of the armrest with respect to the load which is applied to the armrest in the vehicle width direction, and a separate armrest body is attached to the armrest face portion so as to cover the weak portions at its side of the inside of the vehicle compartment.

Accordingly, the sufficient vertical-direction load resistance of the armrest in use can be obtained by rigidity of the separate armrest body and the support face portion. Further, since the weak portions which deform due to the vehicle-width-direction load are provided at the armrest between the armrest face portion and the support face potion and/or at the support face portion, the proper impact-absorption function can be obtained by the deformation of the weak portions during the vehicle side collision. Also, since the weak portions are covered by the separate armrest body at the side of the vehicle compartment, good appearance when viewed from the inside of the vehicle compartment can be provided.

According to another preferred embodiment, the deformation promoting portion is configured in such a manner that ends of the trim body portion and the armrest face portion are disconnected from each other by the load applied to the armrest in the vehicle width direction.

Accordingly, the sufficient vertical-direction load resistance of the armrest in use can be obtained by rigidity of the trim body portion and the support face portion. Further, since the ends of the trim body portion and the armrest face portion are disconnected by the load from the side, i.e., the side-collision load, the proper impact-absorption function can be obtained during the vehicle side collision. Namely, both the sufficient resistance for the load applied to the armrest in the vertical direction and the proper impact-absorption function during the vehicle collision can be obtained.

According to another preferred embodiment, the trim body portion and the armrest face portion, which are formed separately, are configured so as to be usually connected integrally at their ends and disconnected according to the load applied.

Accordingly, since the trim body portion and the armrest face portion are formed separately and they are configured so as to be disconnected according to the load applied, the disconnection of the both during the vehicle side collision can be made smooth.

According to another preferred embodiment, the ends of the trim body portion and the armrest face portion are connected to each other by a connecting member. The connecting member may be configured of a clipping member such as a clip.

Accordingly, the trim body portion and the armrest face portion are normally connected integrally at their ends by the connecting member, while they are disconnected by a release of a connecting force of the connecting member during the vehicle side collision.

According to another preferred embodiment, the connecting member is configured so as to allow the ends of the trim body portion and the armrest face portion to be disconnected when the load applied is greater than a specified load.

Accordingly, since the connecting member allows both portions to be disconnected with the greater load than the specified load which occurs during the vehicle side collision, the armrest face potion can be disconnected easily.

According to another preferred embodiment, there is provided an impact absorbing member between the armrest face portion and a vehicle body. The impact absorbing member may be formed of a metal plate or the like which buckles according to the side-collision load.

Accordingly, the impact can be properly absorbed by deformation of the impact absorbing member.

According to another preferred embodiment, there is provided a recess member at the armrest face portion, and the recess member and the vehicle body are connected by a support bracket. Namely, the above-described impact absorbing member is configured of the support bracket.

Accordingly, the supporting rigidity of the recess member can be improved by the supporting bracket, and thus the recess member can properly sustain the load applied to the recess member, for example, from the passenger.

According to another preferred embodiment, the support bracket is configured so as to be deformed when the load applied is greater than a specified load.

Accordingly, both the proper impact-load absorption during the vehicle side collision and the sufficient supporting rigidity of the recess member in the normal state can be obtained.

DETAILED DESCRIPTION OF THE INVENTION

Figure 1:
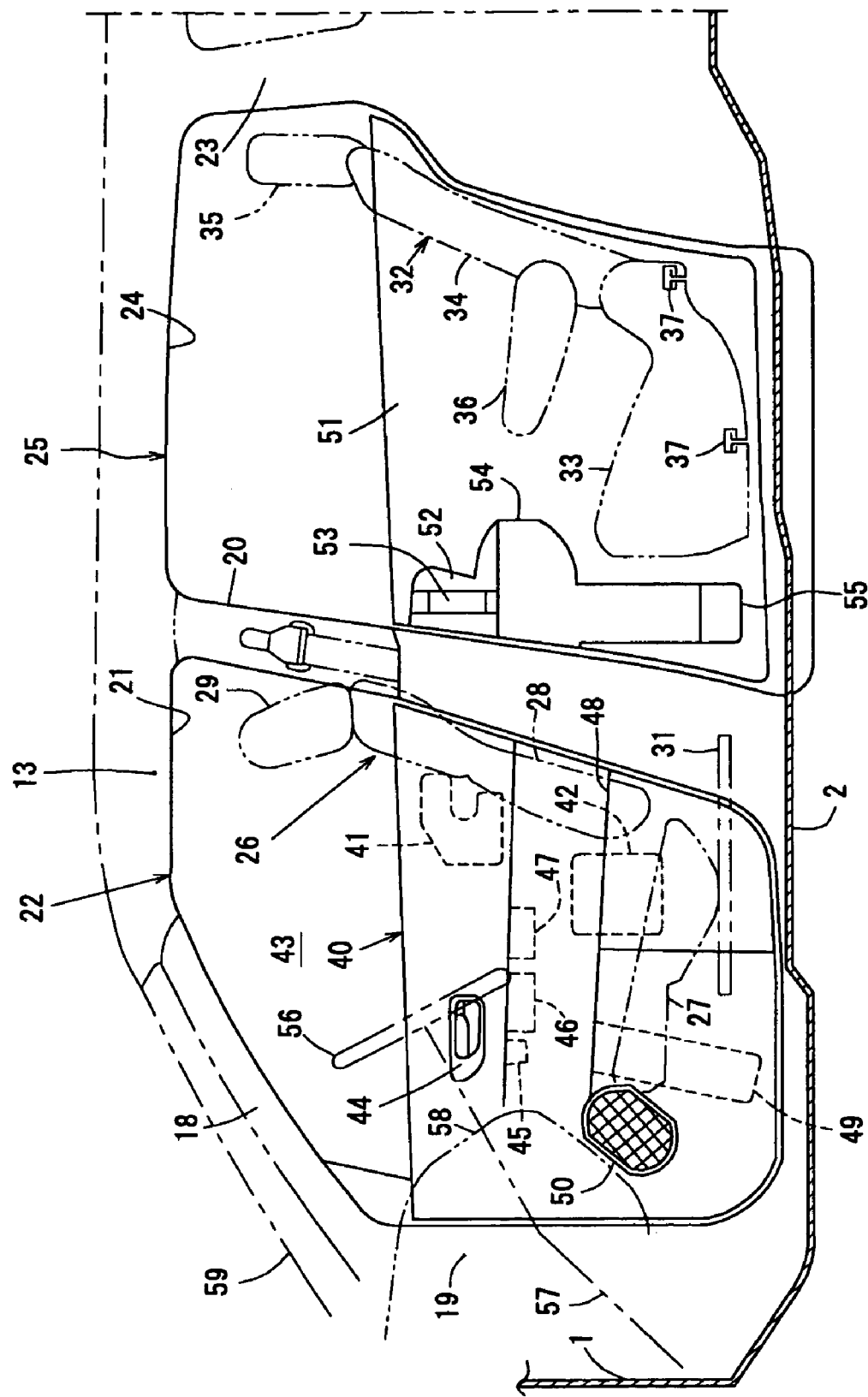
FIG. 1 is a schematic side view of a vehicle equipped with an armrest structure according to the present invention.

Hereinafter, preferred embodiments of the present invention will be described with reference to the accompanying drawings.

Firstly, a vehicle structure will be described referring to FIGS. 1 through 3.

A floor panel 2 extending backward in a substantially horizontal direction is connected to a lower end portion of a dash lower panel 1 (dash panel) at a lower portion of a vehicle. A floor mat 4 with a cushion portion 3 is placed on the floor panel 2, and there are provided a pair of side sills 5 (only one of the side sills is illustrated in drawings) extending in a longitudinal direction of the vehicle at left and right both end portions of the floor panel 2.

Each of side sills 5 is comprised of a side sill inner 6, a side sill outer 7 and a side sill reinforcement 8, which constitutes a vehicle rigidity member having a side sill closed section 9 which extends in the longitudinal direction of the vehicle. A scarf plate 10 is provided so as to cover an upper end connecting potion of the above-described side sill inner 6, side sill outer 7 and side sill reinforcement 8 and a side end portion of the floor mat 4.

Meanwhile, at an upper portion of the vehicle, there is provided a roof panel 12 to cover an upper of a vehicle compartment 11. The roof panel 12 is provided with a pair of roof side rails 13 (only one of the rails is illustrated in drawings) extending in the longitudinal direction of the vehicle at its left and right both end portions. Each of the roof side rails 13 is comprised of a roof rail outer 14 and a roof rail inner 15, which constitutes a vehicle rigidity member having a closed section 16 which extends in the longitudinal direction of the vehicle. Further, a top ceiling 17 is provided below the roof panel 12.

Figure 2:
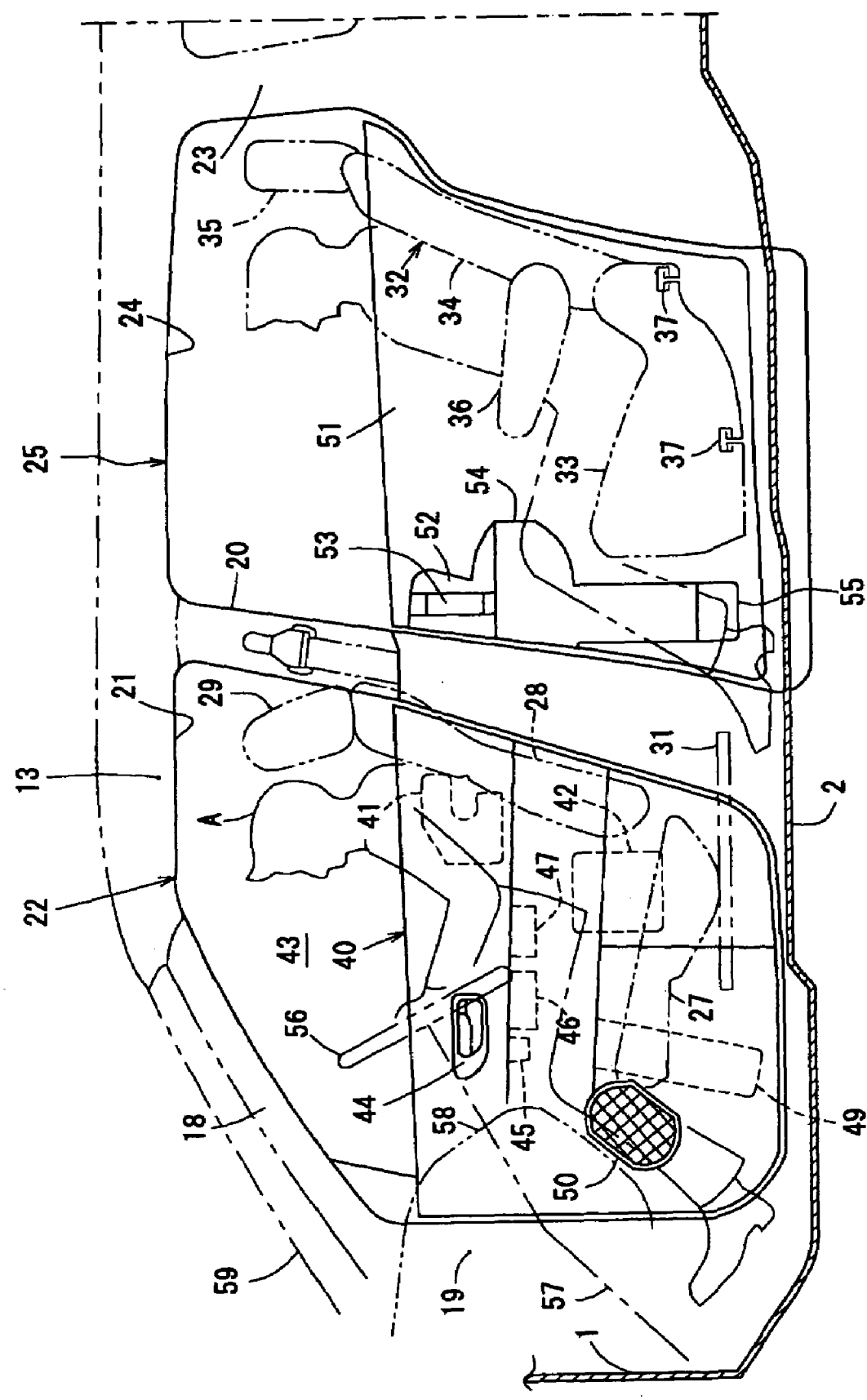
FIG. 2 is a side view showing a sitting state of a passenger.

As illustrated in FIG. 1, a front door 22 is disposed so as to open and close a front door opening 21 (ingress and egress opening) for front passengers which is formed on a vehicle side and enclosed by the roof side rail 13, a front pillar 18, a hinge pillar 19, the side sill and a center pillar 20 which are all vehicle rigidity members. Also, a slide door type of rear door 25 is disposed so as to open and close a rear door opening 24 (ingress and egress opening) for rear passengers which is formed on the vehicle side and enclosed by the roof side rail 13, the center pillar 20, the side sill 5 and a quarter pillar 23 which are all vehicle rigidity members.

There is provided a front seat 26 on the floor panel 2 in the vehicle compartment 11 which corresponds to the above-described front door opening 21. The front seat 26 includes a seat cushion 27, a seat back 28, a headrest 29 and an armrest 30, which is configured so as to slide in the longitudinal direction via a pair of seat rails 31, 31 (including an upper rail and a lower rail) disposed below the seat.

Meanwhile, there is provided a rear seat 32 on the floor panel 2 in the vehicle compartment 11 which corresponds to the above-described rear door opening 24. The rear seat 32 includes a seat cushion 33, a seat back 34, a headrest 35 and an armrest 36, which is configured so as to slide in a vehicle width direction, i.e., a lateral direction, via a pair of seat rails 37, 37 (including an upper rail and a lower rail) disposed below the seat.

Figure 3:
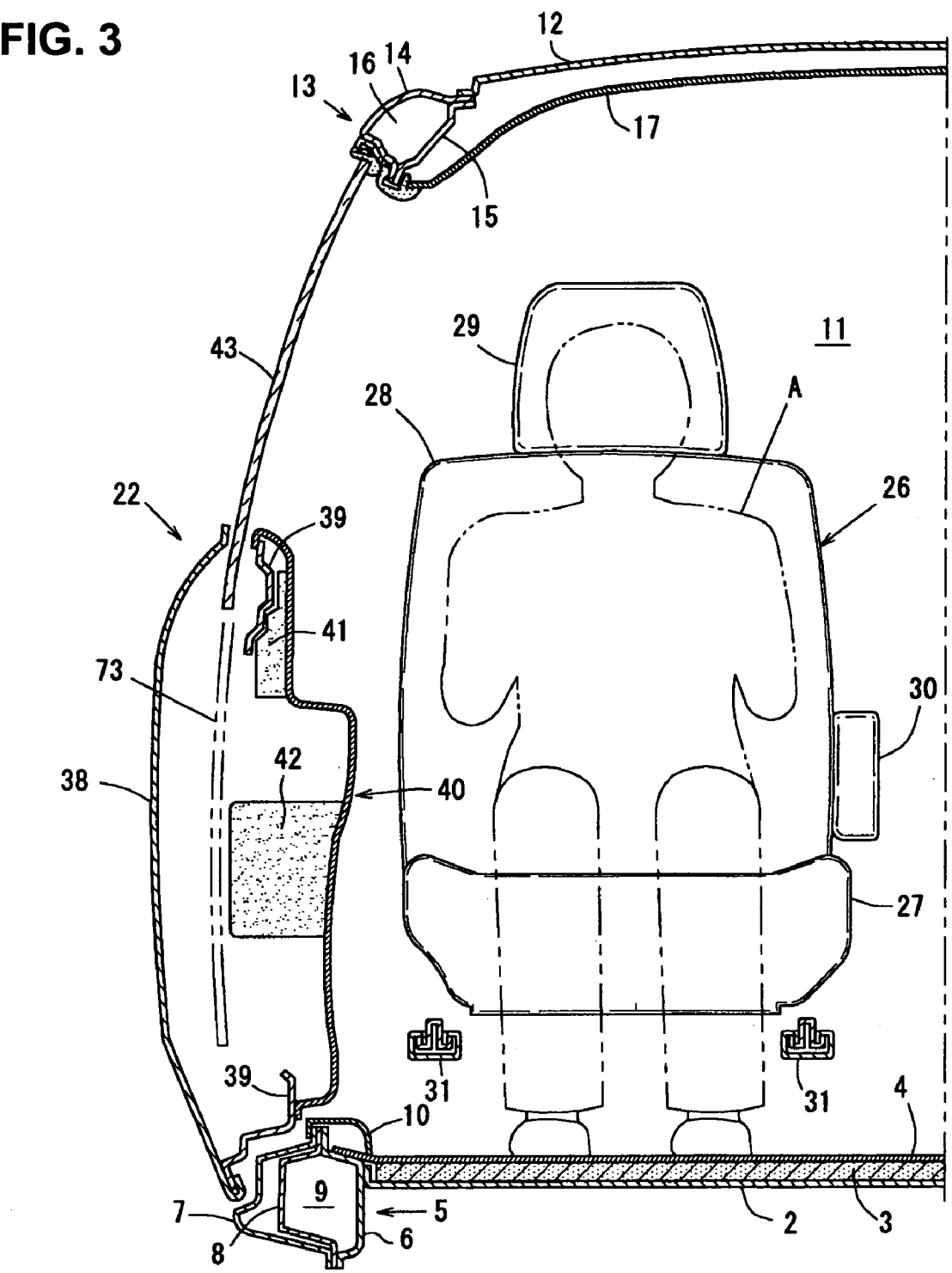
FIG. 3 is an elevation view of a major part of FIG. 2.

As shown in FIG. 3, the front door 22 (side door) constitutes a door body which is formed by coupling a door outer panel 38 and a door inner panel 39, and a door trim 40 which is made of synthetic resins or the like is provided on an inside of the door inner panel 39. An impact absorbing pad 41 as an impact absorbing member is provided at the outside of the door trim 40 which substantially corresponds to a shoulder portion of a front passenger A, and an impact absorbing pad 42 as an impact absorbing member is provided at the outside of the door trim 40 which substantially corresponds to a lumber portion of the front passenger A. Further, the front door 22 includes a door window glass 43 going up and down which is controlled by a window regulator (not illustrated). Also, as shown in FIGS. 1 and 2, a door inner handle 44, a mirror switch portion 45, a power window switch portion 46, a recess member 47, pocket portions 48, 49 and a speaker 50 are provided on the door trim 40.

Meanwhile, there is provided a door trim 51 on the rear door 25. On the door trim 51, there are provided a recess portion 52 which is recessed outward, a pull type of handle 53, and pocket portions 54, 55. Herein, a steering wheel 56, a steering shaft 57, an instrument panel 58 and a window shield 59 are also illustrated in FIGS. 1 and 2.

EMBODIMENT 1

An armrest structure for a vehicle according to a first embodiment will be described referring to FIGS. 4, 5 and 6.

The above-described door trim 40 is provided with an armrest 60 formed integrally with the door trim 40 which protrudes and extends toward the passenger A from an inside wall (the door inner panel 39 of the front door 22 in the embodiment) of the vehicle compartment 11.

The armrest 60 comprises a trim body portion 61 (upper portion of the door trim 40) which covers the inside wall of the vehicle compartment, an armrest face portion 62 for armrest of the passenger A which extends in a substantially horizontal direction from the trim body portion 61 toward the inside of the vehicle compartment 11 by a specified length L1 (a necessary length for passengers to put their arms), and a support face portion 63 which extends continuously from the armrest face portion 62 downward.

Figure 5:
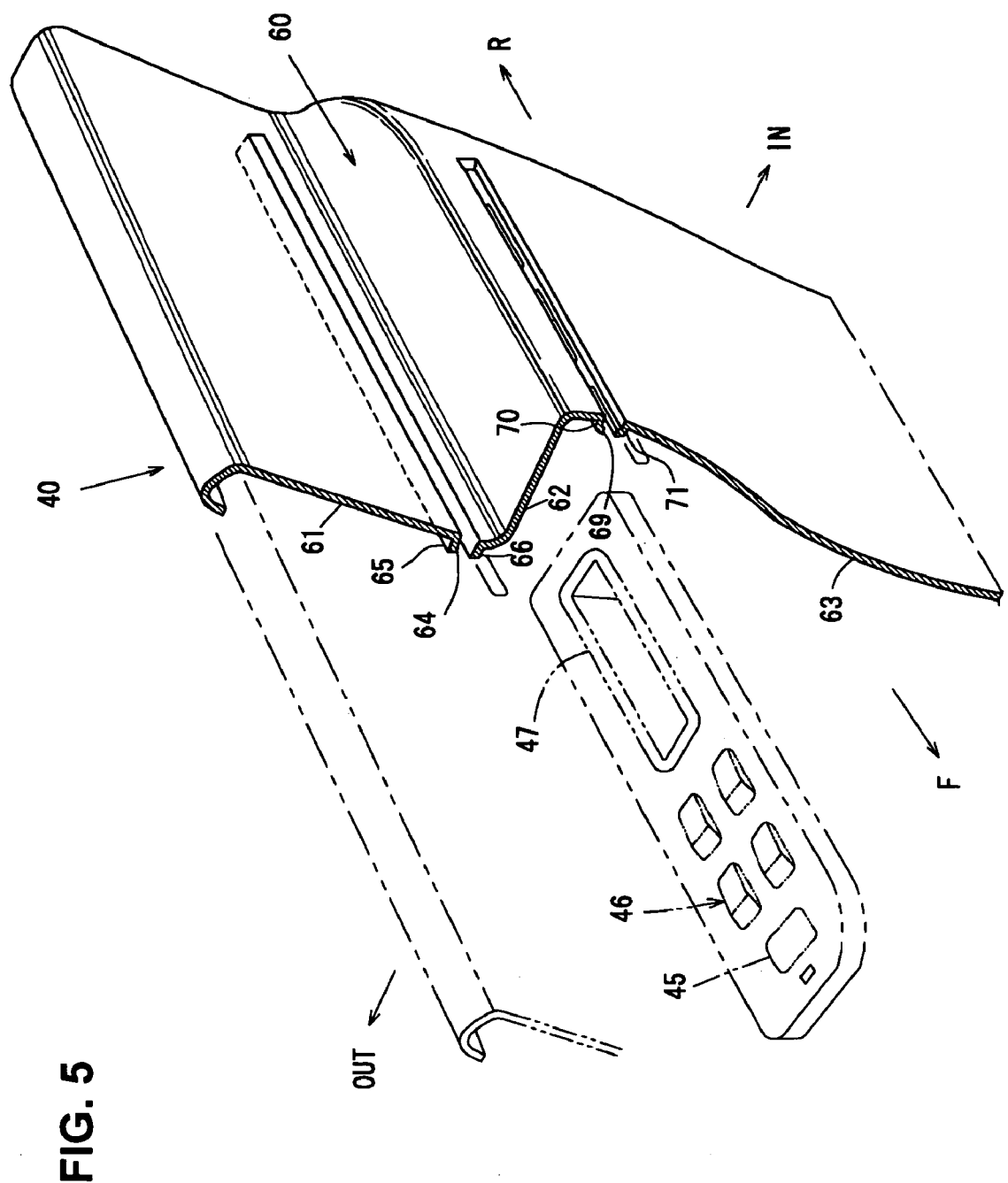
FIG. 5 is a perspective view of an armrest in a state where a garnish is detached.
Figure 6:
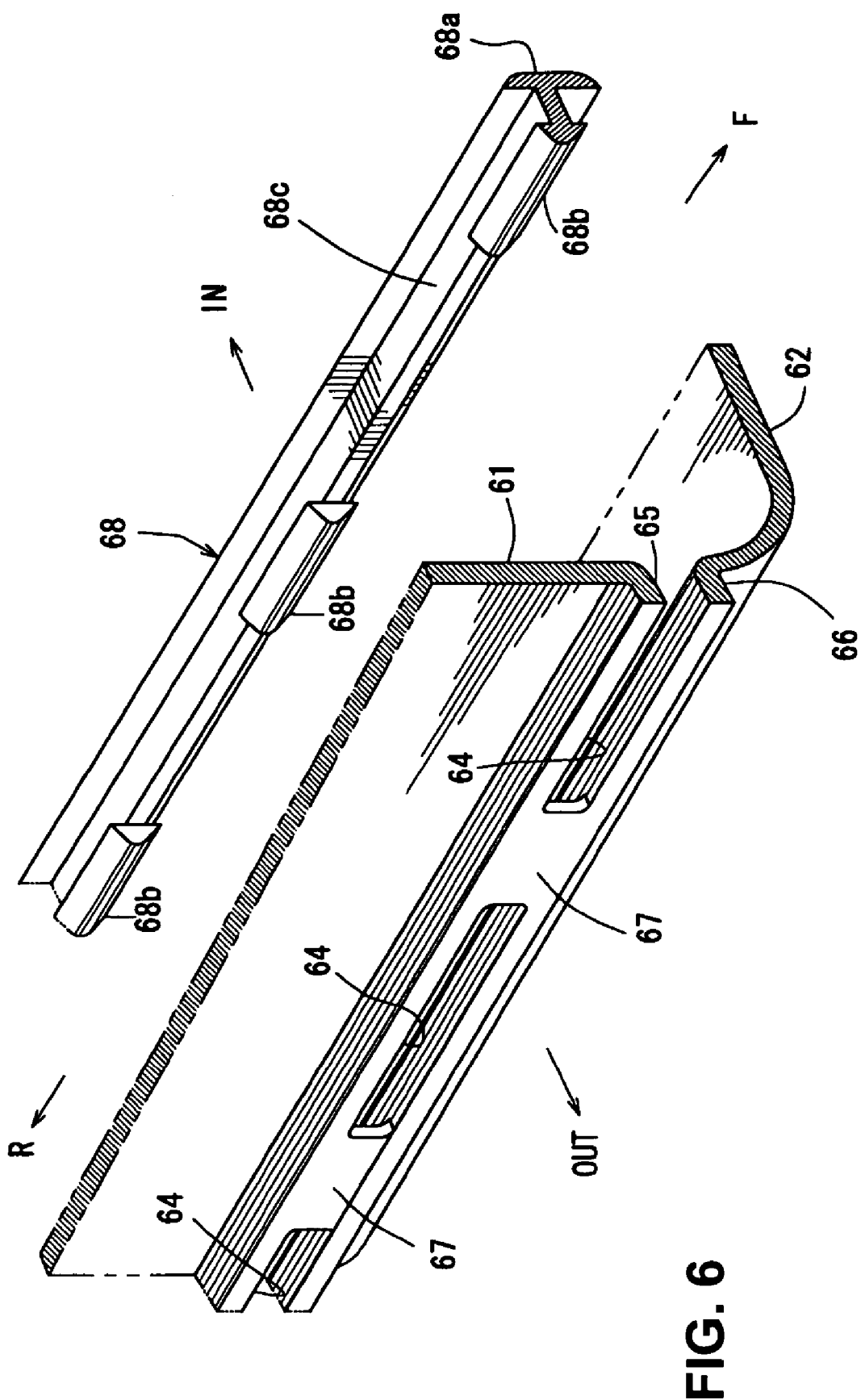
FIG. 6 is an exploded perspective view showing a weak portion and the garnish.

Herein, as illustrated in FIGS. 5 and 6, there are provided plural openings 64 . . . 64 as a weak portion (deformation promoting portion) which promotes a deformation of the armrest with respect to a load which is applied to the armrest in the vehicle width direction, which are formed at a vertical wall of the trim body portion 61 around a corner portion between the trim body portion 61 and the armrest face portion 62.

These openings 64 . . . 64 are formed at a vertical wall portion 67 interconnecting upper and lower flange portions 65, 66 which are provided to extend from the lower portion of the trim body portion 61 toward the vehicle outside respectively. Accordingly, sufficient rigidity of the armrest 60 in the vertical direction is provided by the vertical wall portion 67 and the upper and lower flange portions 65, 66. Rigidity of the armrest 60 in the vehicle width direction, however, is reduced properly by forming the openings 64 . . . 64. Herein, the greater opening areas of the openings 64 . . . 64 are, the lower the rigidity of the armrest 60 in the vehicle width direction becomes. The thicker the vertical wall portion 67 are, the higher the rigidity of the armrest 60 in the vertical direction becomes. Accordingly, such rigidity of the armrest 60 in the vertical direction and/or in the vehicle width direction can be set properly by adjusting the above-described opening area and/or thickness.

Figure 7:
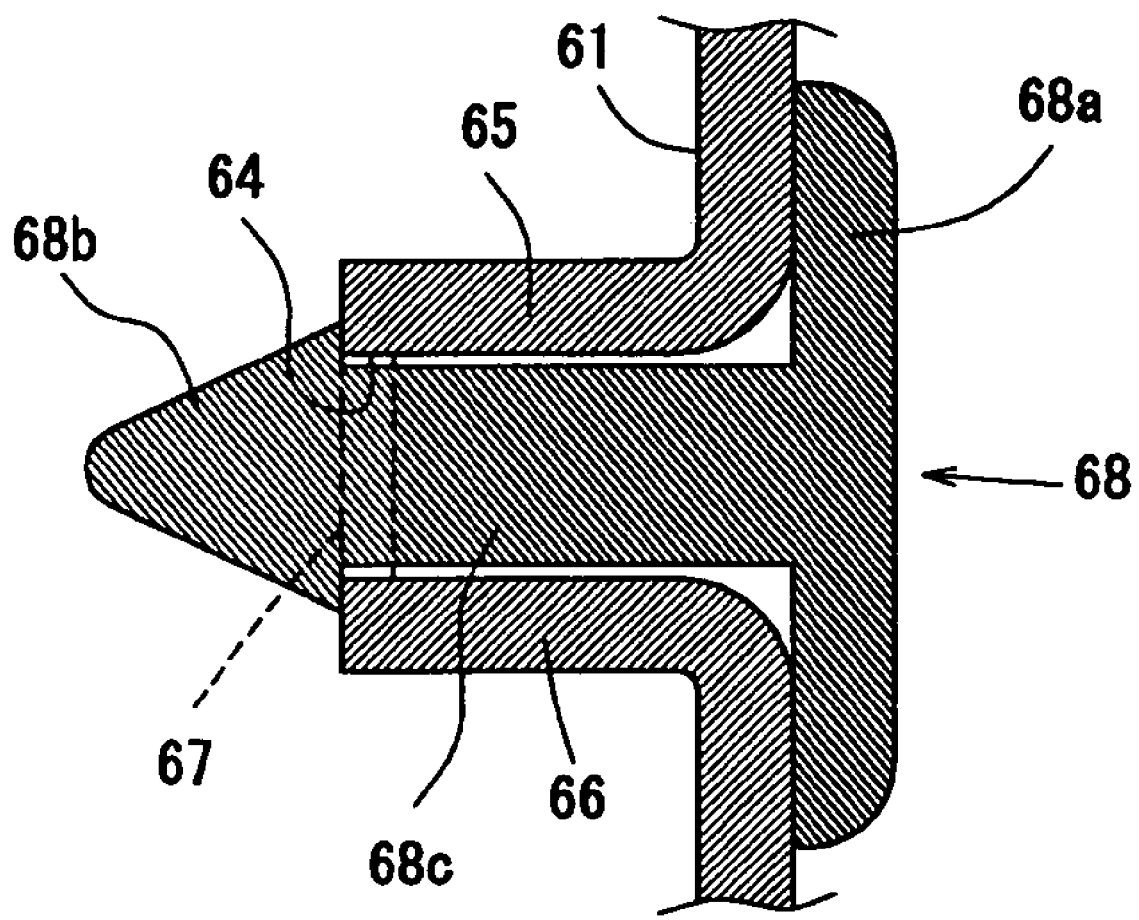
FIG. 7 is an enlarged sectional view showing an attaching state of the garnish.

There is provided a garnish 68 which covers each of the openings 64 . . . 64 as the weak portion from the inside of the vehicle compartment 11, extending along the openings 64 . . . 64. As illustrated in FIGS. 6 and 7, the garnish 68 is made from synthetic resins and integrally comprised of a base portion 68a which is of substantially flat shape and extends in the longitudinal direction, engagement portions 68b . . . 68b which are disposed to engage with opening edges of the openings 64 . . . 64 respectively corresponding to the openings and have cross sections with substantially triangle shapes, and a connecting portion 68c which connects the base portion 68a with the engagement portions 68b . . . 68b. The garnish 68 is configured so as to be detached from the openings 64 . . . 64 by an abnormal load (side-collision load) applied to the armrest 60 in the vehicle width direction. Proper controlling engagement between the engagement portions 68b . . . 68b and the opening edges of the openings 64 . . . 64 can allow the garnish 68 to be detached preferably from the openings 64 . . . 64 by the side-collision load.

Figure 4:
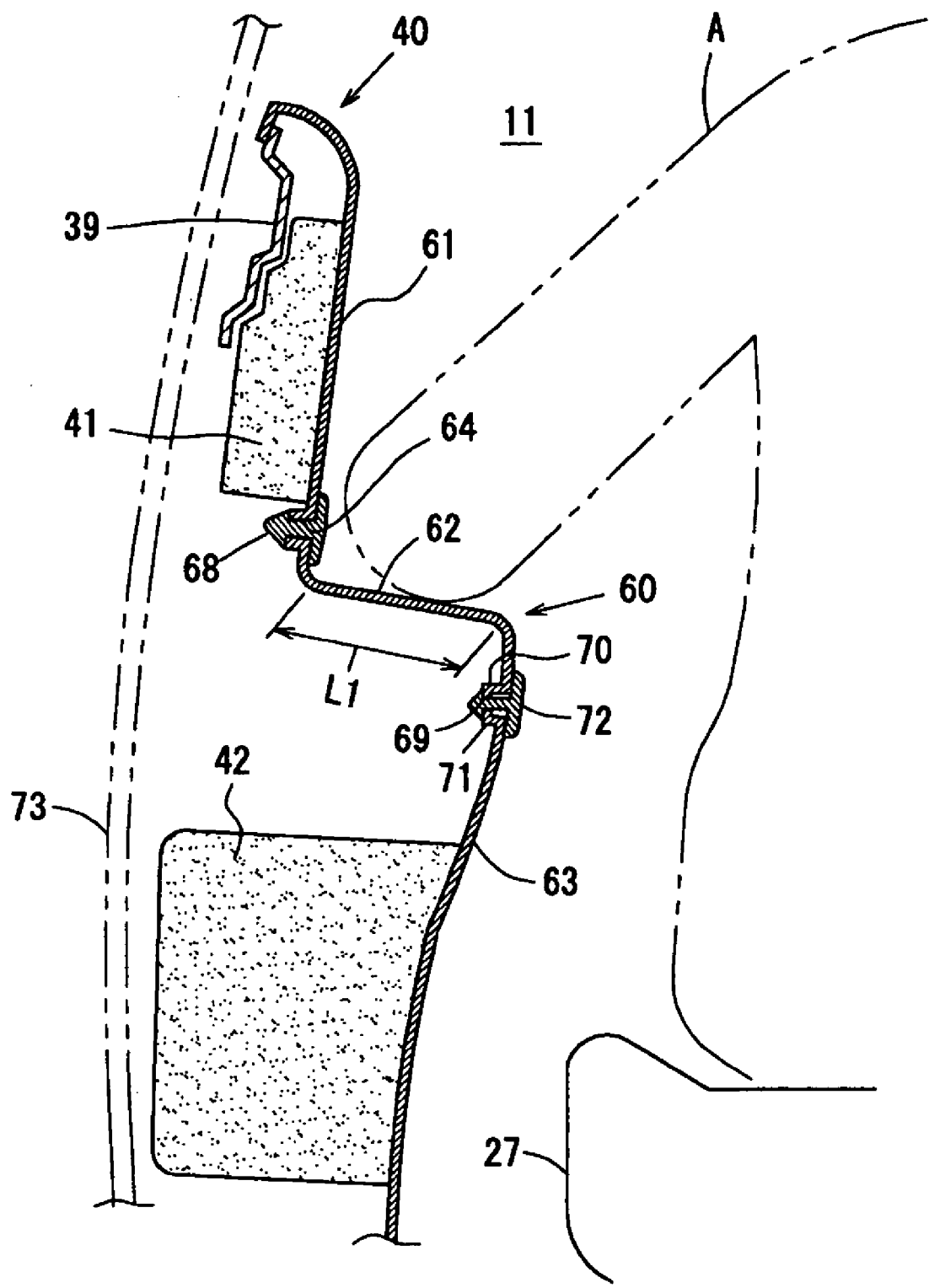
FIG. 4 is an elevation view of a major part showing an armrest structure for a vehicle according to a first embodiment of the present invention.

Further, as illustrated in FIGS. 4 and 5, there are provided plural openings 69 . . . 69 as a weak portion which promotes the deformation of the armrest with respect to the load which is applied to the armrest in the vehicle width direction, which are formed at a vertical wall of the support face portion 63 in or near a corner portion between the armrest face portion 62 and the support face portion 63.

These openings 69 . . . 69 are formed, like the openings 64 . . . 64 formed at the trim body portion 61, at a vertical wall portion interconnecting upper and lower flange portions 70, 71 which are provided to extend from an upper portion of the support face portion 63 toward the vehicle outside respectively. Accordingly, sufficient rigidity of the armrest 60 in the vertical direction is provided by the vertical wall portion and the upper and lower flange portions 70, 71 as well. Meanwhile, rigidity of the armrest 60 in the vehicle width direction is reduced properly by forming the openings 69 . . . 69 as well.

Further, there is provided a garnish 72 which covers each of the openings 69 . . . 69 as the weak portion from the inside of the vehicle compartment 11, extending along the openings 69 . . . 69. The garnish 72 is, like the garnish 68 attached to the trim body portion 61, made from synthetic resins and integrally comprised of a base portion, engagement portions, and a connecting portion. The garnish 72 is also configured so as to be detached from the openings 69 . . . 69 by a load (side-collision load) applied to the armrest 60 in the vehicle width direction which is greater than a specified load.

Herein, the above-described mirror switch portion 45, power window switch 46 and recess 47 are provided before the armrest face portion 62 of the armrest 60 as illustrated in FIGS. 1 and 5. As illustrated in FIG. 4, the upper impact absorbing pad 41 is provided outside of the trim body portion 61 and the lower impact absorbing pad 42 is provided outside of the support face portion 63.

Figure 8:
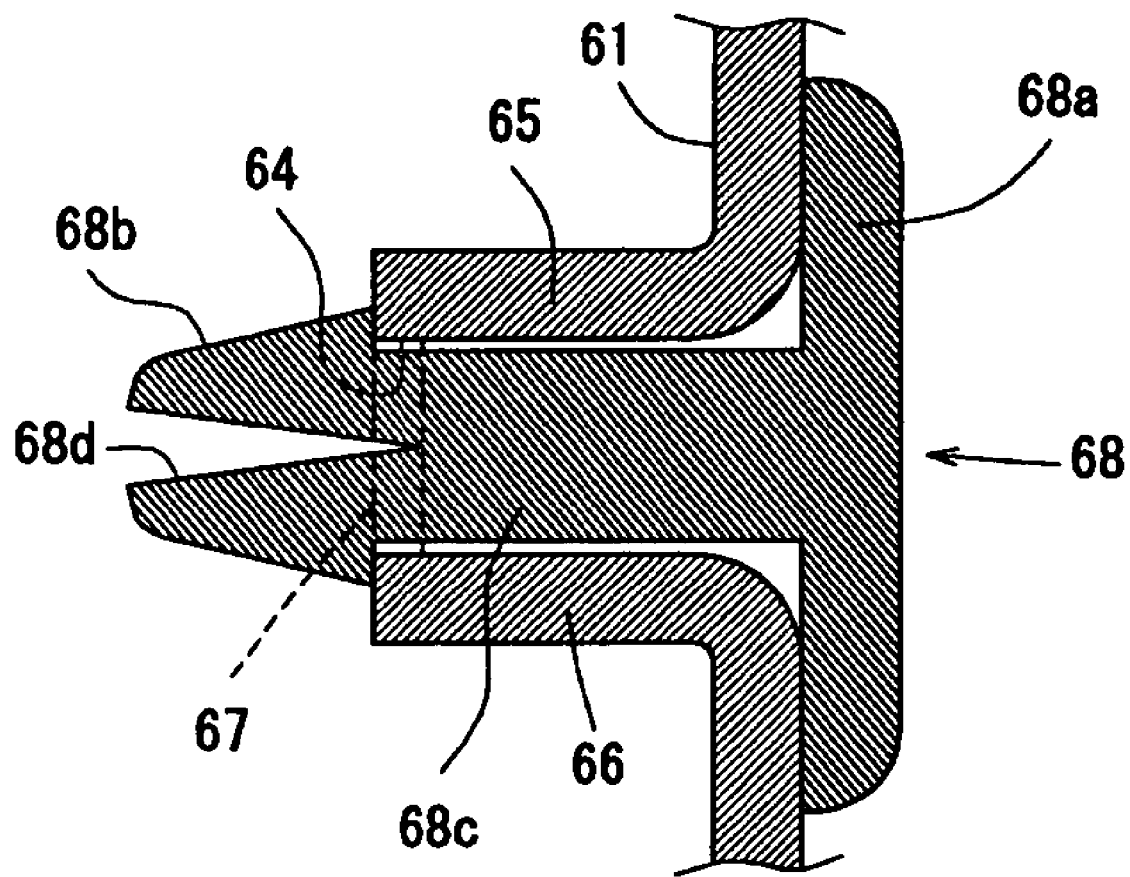
FIG. 8 is an enlarged sectional view showing a modified embodiment of the garnish.

Herein, the garnish 68, as illustrated in FIG. 8, which is provided with a V-shaped slit 68d which extends from a central end portion of the engagement portion 68b to or near a front end of the connecting portion 68c may be used instead of the one illustrated in FIG. 7 to improve the attachment of the garnish 68 to the openings 64 . . . 64.

In FIGS. 3 and 4, a reference numeral 73 denotes a locus line along which the door window glass 43 goes up and down. Also, arrows F, R, IN, and OUT show respectively directions of forward, backward, inside, and outside of the vehicle.

Figure 9:
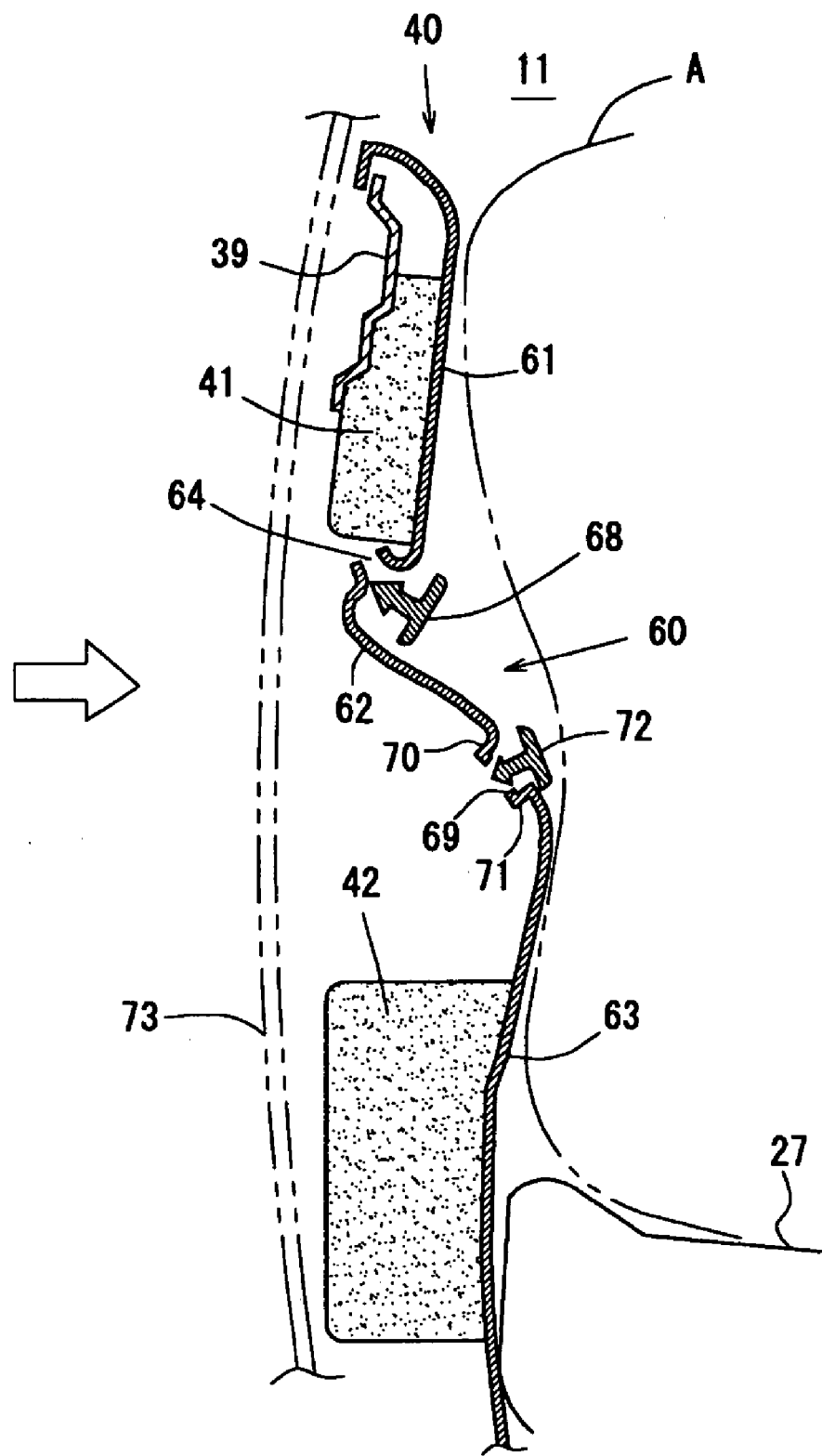
FIG. 9 is an explanatory diagram showing a deformation state of the armrest during a vehicle side collision.

The armrest 60 with the above-described structure has sufficient rigidity (load resistance) in the vertical direction for properly sustaining the arm of the passenger A put on the armrest face portion 62. Further, the armrest 60 has properly low rigidity in the vehicle width direction and the garnishes 68, 72 are respectively detached from the openings 64 . . . 64, 69 . . . 69 as weak portions due to the greater load in the vehicle width direction than the specified load. Accordingly, in the event of the vehicle collision, firstly the garnishes 68, 72 are respectively detached from the openings 64 . . . 64, 69 . . . 69 as illustrated in FIG. 9 from their original states illustrated in FIGS. 4. The upper and lower openings 64 . . . 64, 69 . . . 69 of the armrest 60 yield to the load, and the armrest face portion 62 deforms. Then, after a protruding distance toward the inside of the vehicle compartment has been reduced, the upper and lower impact absorbing pads 41, 42 efficiently absorb the impact against the passenger.

As described above, according to the present embodiment, there is provided the armrest structure for the vehicle, in which the armrest 60 is disposed so as to protrude and extend toward the passenger A from the inside wall of the vehicle compartment 11, comprising the trim body portion 61 covering the inside wall of the vehicle compartment 11, the armrest face portion 62 extending in the substantially horizontal direction from the trim body portion 61 toward the inside of the vehicle compartment 11, the support face portion 63 extending continuously from the armrest face portion 62 downward, and the weak portion (see the openings 64 . . . 64) which is provided at the armrest 60 between the trim body portion 61 and the armrest face portion 62 so as to promote the deformation of the armrest 60 with respect to the load which is applied to the armrest 60 in the vehicle width direction. And further, there is provided the garnish 68 covering the above-described weak portion (see the openings 64 . . . 64) from the inside of the vehicle compartment 11.

Accordingly, since the weak portion (see the openings 64 . . . 64) is covered by the garnish 68 during the use of the armrest, the good appearance of the armrest 60 when viewed from the inside of the vehicle compartment 11 can be provided by the garnish 68, along with maintaining sufficient rigidity and load resistance of the armrest 60 in the vertical direction. Further, since the weak portion (see the openings 64 . . . 64) which promotes the deformation of the armrest 60 easily yields to the vehicle-width-direction load occurring during the vehicle side collision, the proper impact absorption function of the armrest 60 can be obtained. Namely, both the sufficient resistance for the load applied to the armrest 60 in the vertical direction and the proper impact-absorption function can be obtained.

Further, the weak portion comprises the openings 64 . . . 64 which extend in the longitudinal direction of the vehicle, and the garnish 68 is provided so as to extend along the openings 64 . . . 64 and cover the openings 64 . . . 64.

Accordingly, strength of the armrest 60 is properly adjusted and designed by the openings 64 . . . 64, and thus controlling the impact absorption function for the side-collision load can be facilitated. Also, the garnish 68 can be easily attached to the armrest 60 by the use of the openings 64 . . . 64 without any other particular attaching materials such as adhesive or the like.

Further, the garnish 68 is configured so as to be detached from the weak portion (see the openings 64 . . . 64) when the load applied is greater than the specified load.

Accordingly, since the garnish 68 is properly detached from the weak portion (see the openings 64 . . . 64) by the greater side-collision load, the proper impact absorption function can be obtained without any prevention by the garnish 68. The good appearance of the armrest 60 in use when viewed from the inside of the vehicle compartment 11 can be also obtained by the garnish 68. Accordingly, both the good appearance and the proper impact absorption can be obtained.

In addition, there is further provided the weak portion (see the openings 69 . . . 69) to promote the deformation of the armrest 60 with respect to the load at part of the support face portion 63 of the armrest 60, and there is provided the garnish 72 covering the weak portion (see the openings 69 . . . 69) from the inside of the vehicle compartment 11.

Accordingly, since the weak portion (see the openings 69 . . . 69) is covered by the garnish 72 during the use of the armrest 60, the good appearance of the armrest 60 when viewed from the inside of the vehicle compartment 11 can be provided by the garnish 72, along with maintaining sufficient rigidity and load resistance of the armrest 60 in the vertical direction. Further, since the weak portion (see the openings 69 . . . 69) at the support face portion 63 also yields to the side-collision load in addition to the weak portion (see the openings 64 . . . 64) formed between the trim body portion 61 and the armrest face portion 62, the impact absorption function can be further improved. Namely, sufficient vertical-direction rigidity can be maintained by the attached garnish 72, and also further proper decreasing in a strength of the armrest 60 in the vehicle width direction can be obtained by the use of the both weak portions (the openings 64 . . . 64 provided between the trim body portion 61 and the armrest face portion 62, and the openings 69 . . . 69 at the support face portion 63), thereby improving the impact absorption.

Further, the above-described weak portion comprises the openings 69 . . . 69 which extend in the longitudinal direction of the vehicle, and the garnish 72 is provided so as to extend along the openings 69 . . . 69 and cover the openings 69 . . . 69.

Accordingly, strength of the armrest is properly adjusted and designed by the openings 69 . . . 69, and thus controlling the impact absorption function to the side-collision load can be facilitated. Also, the garnish 72 can be easily attached to the armrest 60 by the use of the openings 69 . . . 69 without any other particular attaching materials such as adhesive or the like.

Also, the garnish 72 is configured so as to be detached from the weak portion (see the openings 69 . . . 69) when the load applied is greater than the specified load.

Accordingly, since the garnish 72 is properly detached from the weak portion (see the openings 69 . . . 69) by the greater side-collision load, the proper impact absorption function can be obtained without any prevention by the garnish 72. The good appearance of the armrest 60 in use when viewed from the inside of the vehicle compartment 11 can be also obtained by the garnish 72. Accordingly, both the good appearance and the proper impact absorption can be obtained.

Further, according to the present embodiment described above, there is provided the armrest structure for the vehicle, in which the armrest 60 is disposed so as to protrude and extend toward the passenger A from the inside wall of the vehicle compartment 11, comprising the trim body portion 61 covering the inside wall of the vehicle compartment 11, the armrest face portion 62 extending in the substantially horizontal direction from the trim body portion 61 toward the inside of the vehicle compartment 11, the support face portion 63 extending continuously from the armrest face portion 62 downward, and the weak portion (see the openings 69 . . . 69) which is provided at the armrest 60 at the support face portion 63 so as to promote the deformation of the armrest 60 with respect to the load which is applied to the armrest 60 in the vehicle width direction. And further, there is provided the garnish 72 covering the above-described weak portion (see the openings 69 . . . 69) from the inside of the vehicle compartment 11.

Accordingly, since the weak portion (see the openings 69 . . . 69) is covered by the garnish 72 during the use of the armrest 60, the good appearance of the armrest when viewed from the inside of the vehicle compartment 11 can be provided by the garnish 72, along with maintaining sufficient rigidity and load resistance of the armrest 60 in the vertical direction. Further, since the weak portion (see the openings 69 . . . 69) which promotes the deformation of the armrest 60 easily yields to the vehicle-width-direction load occurring during the vehicle side collision, the impact absorption function can be improved. Namely, both the sufficient resistance for the load applied to the armrest 60 in the vertical direction and the proper impact-absorption function can be obtained.

In addition, the armrest 60 is formed at the door trim 40 of the side door (see the front door 22) of the vehicle.

Accordingly, since the armrest structure according to the present invention is applied to the side door of the vehicle which tends to be pushed into the vehicle compartment 11 during the vehicle side collision, the impact absorption function can be attained preferably.

Further, there is provided the impact absorbing member (see the impact absorbing pad 41) at the outside of the trim body portion 61.

Accordingly, in the event that the garnishes 68, 72 are detached from the weak portion (see the openings 64 . . . 64, 69 . . . 69) due to the side vehicle collision and then the door trim 40 hits the passenger, the impact which may be applied to the passenger can be absorbed preferably by the impact absorbing member (see the impact absorbing pad 41).

Further, there is further provided the impact absorbing member (see the impact absorbing pad 42) at the outside of the support face portion 63.

Accordingly, since impact absorbing members (see the impact absorbing pads 41, 42) are provided separately above and below the armrest face portion 62 of the armrest 60, the impact which may be applied to the passenger after the garnishes 68, 72 are detached from the weak portion (see the openings 64 . . . 64, 69 . . . 69) and the armrest face potion 62 deforms can be absorbed efficiently by the both absorbing members (see the impact absorbing pads 41, 42).

EMBODIMENT 2

Figure 10:
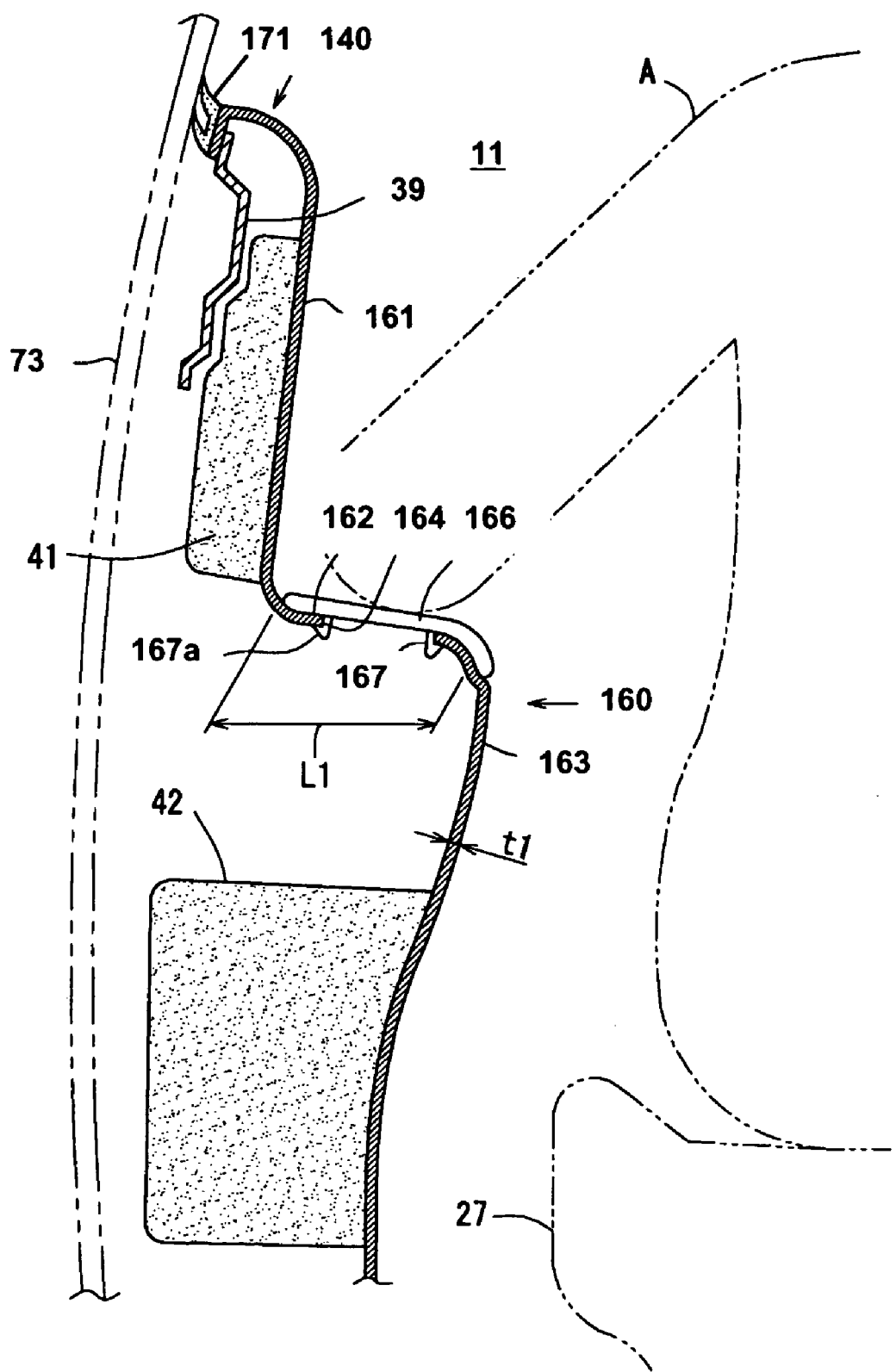
FIG. 10 is an elevation view of a major part showing an armrest structure for a vehicle according to a second embodiment of the present invention.

An armrest structure for a vehicle according to a second embodiment will be described referring to FIGS. 10, 11 and 12.

The above-described door trim 140 is provided with an armrest 160 formed integrally with the door trim 140 which protrudes and extends toward the passenger A from an inside wall (the door inner panel 39 of the front door 22 in the embodiment) of the vehicle compartment 11.

The armrest 160 comprises a trim body portion 161 (upper portion of the door trim 140) which covers the inside wall of the vehicle compartment, an armrest face portion 162 for armrest of the passenger A which extends in the substantially horizontal direction from the trim body portion 161 toward the inside of the vehicle compartment 11 by the specified length L1 (a necessary length for passengers to put their arms), and a support face portion 163 which extends continuously from the armrest face portion 162 downward.

There are provided first openings 164 . . . 164 as a weak portion which promotes a deformation of the armrest with respect to the load which is applied to the armrest 140 in the vehicle width direction, which are formed at the armrest face potion 162. The first openings 164 . . . 164 are formed of plural holes (two holes in the embodiment) as apparent from FIG. 11, and there are provided connecting pieces 165 . . . 165 which remain between the two openings 164, 164 extending in the longitudinal direction and extend in the vehicle width direction. Herein, the width of the openings 164 . . . 164 in the vehicle width direction is set at a half of the above-described length L1 of the armrest face portion 162 or more so as to reduce properly the rigidity of the armrest 160.

There is provided at the armrest face portion 162 a separate armrest body 166 which covers the first openings 164 . . . 164 as the weak portion from the inside of the vehicle compartment 11. As illustrated in FIG. 12, the armrest body 166 is configured in such a manner that a base member 167 made from synthetic resins is covered by an outer layer member 168, and there are plural pairs of engagement pieces 167a, 167a which are formed integrally at the bottom face of the base member 167 and disposed to engage with opening edges of the first openings 164 . . . 164. Accordingly, the separate armrest body 166 is attached easily to the armrest 160 by the use of the first openings 164 . . . 164 without any other attaching members such as adhesive. The armrest body 166 is configured so as to be detached from the first openings 164 . . . 164 by a load (side-collision load) applied to the armrest 60 in the vehicle width direction which is greater than a specified load.

Figure 11:
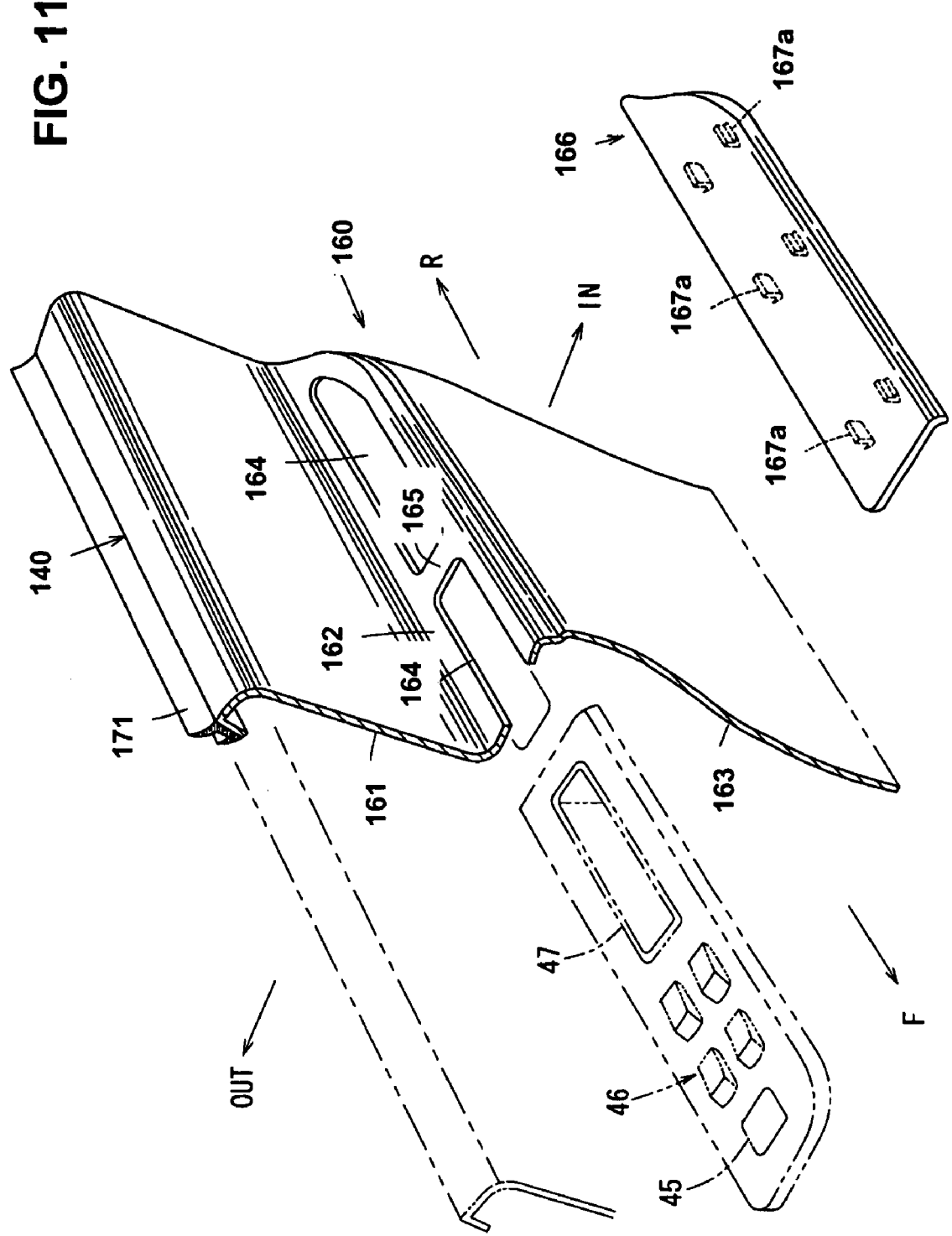
FIG. 11 is an exploded perspective view showing the armrest structure for a vehicle.
Figure 12:
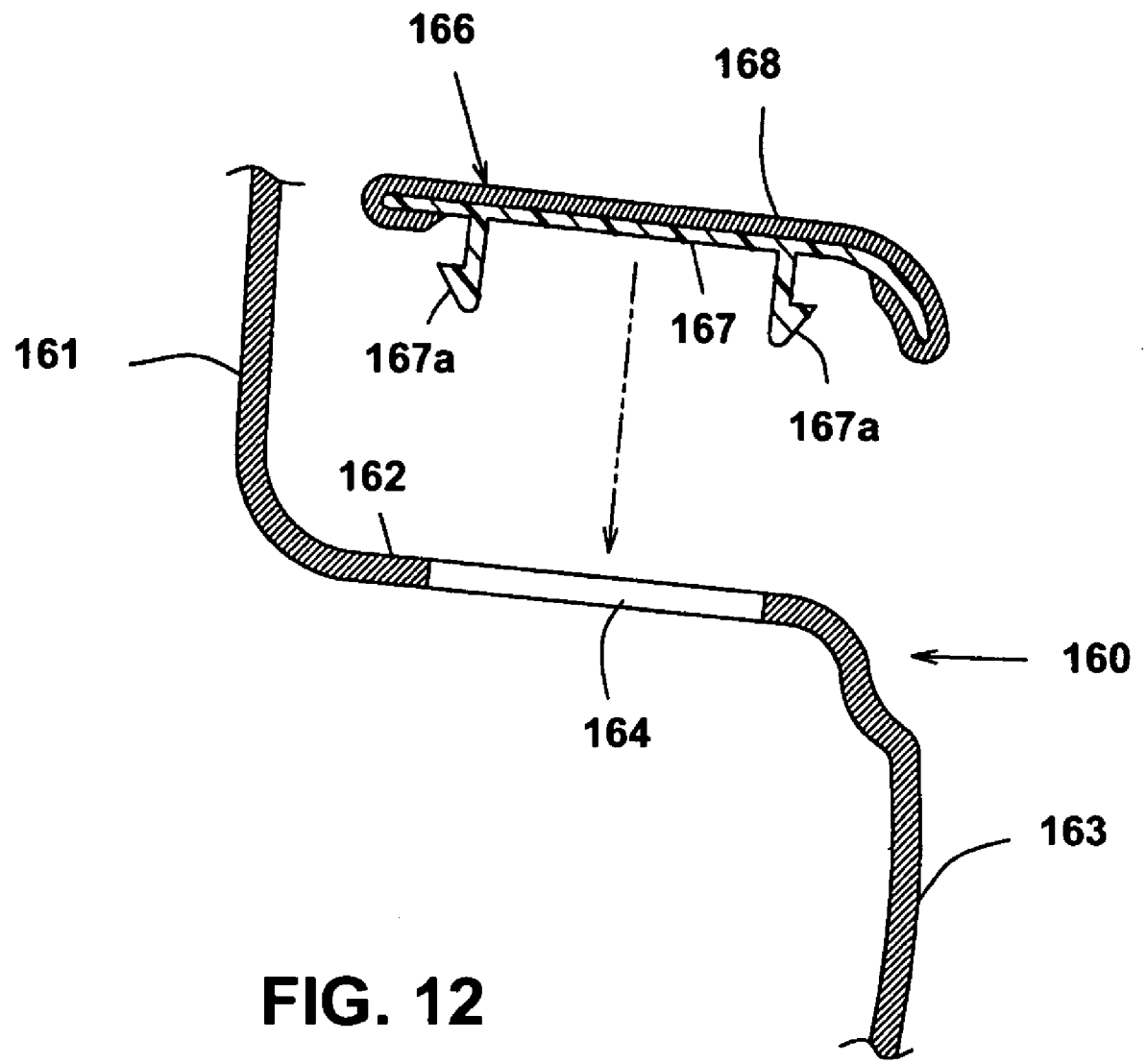
FIG. 12 is an exploded sectional view showing the armrest and an armrest body.

Herein, the above-described mirror switch portion 45, power window switch 46 and recess 47 are provided before the armrest face portion 162 of the armrest 160 as illustrated in FIG. 11. As illustrated in FIG. 10, the upper impact absorbing pad 41 is provided outside of the trim body portion 161 and the lower impact absorbing pad 42 is provided outside of the support face portion 163. In FIG. 10, the reference numeral 73 denotes the locus line along which the door window glass 43 goes up and down. Also, in FIGS. 10 and 11, a reference numeral 171 denotes a weather strip inner seal, and arrows F, R, IN, and OUT show respectively directions of forward, backward, inside, and outside of the vehicle.

Figure 13:
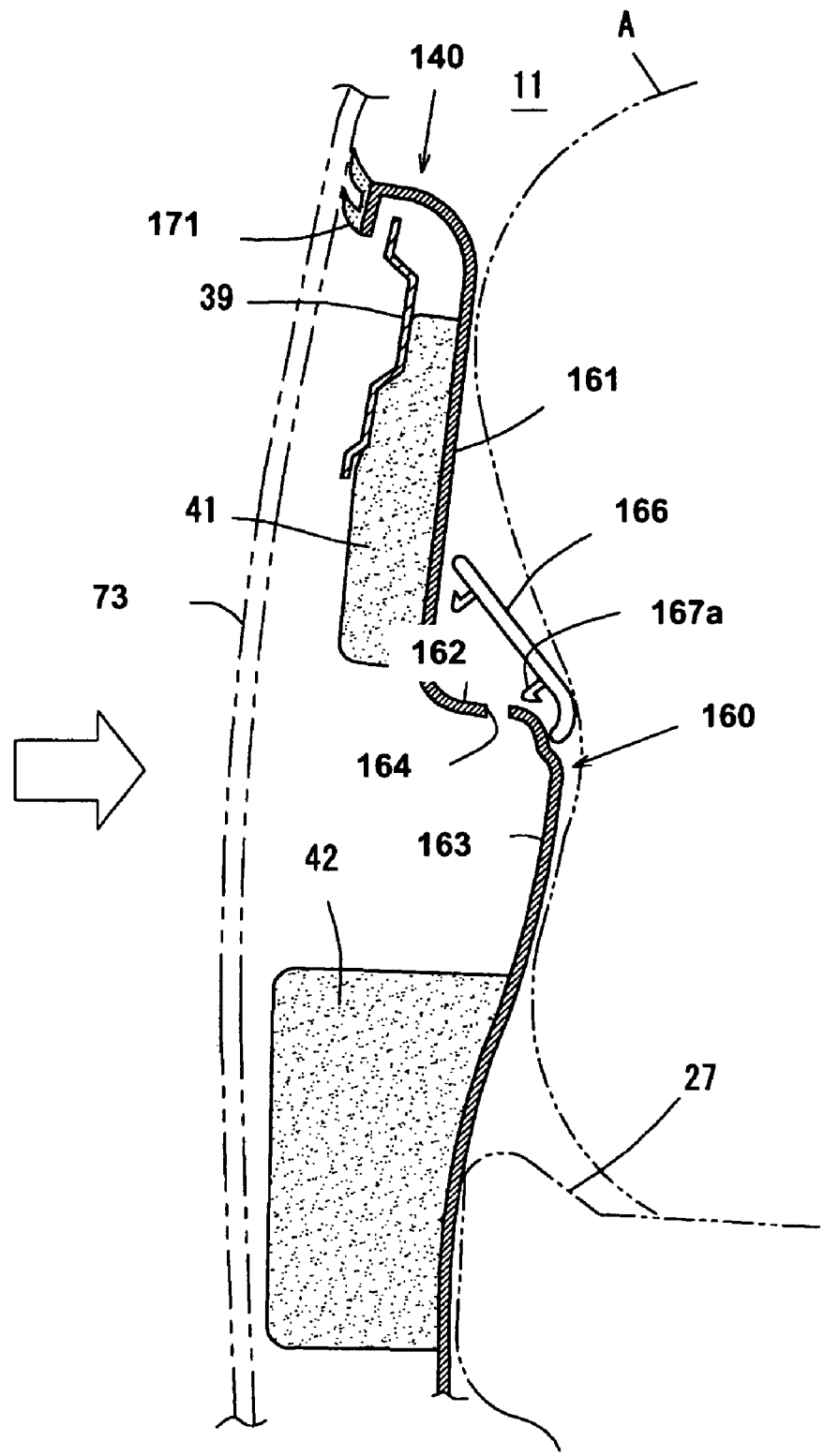
FIG. 13 is an explanatory diagram showing a deformation state of the armrest during the vehicle side collision.

The armrest 160 with the above-described structure has sufficient rigidity (load resistance) in the vertical direction for properly sustaining the arm of the passenger A put on the armrest body 166 on the armrest face portion 162. Further, the armrest 160 has properly low rigidity in the vehicle width direction and the armrest body 166 is respectively detached from the first openings 164 . . . 164 as the weak portion by the greater load in the vehicle width direction than the specified load. Accordingly, in the event of the vehicle collision, firstly the armrest body 166 is detached from the first openings 164 . . . 164 as illustrated in FIG. 13 from its original state illustrated in FIGS. 10. The connecting pieces 165 . . . 165 (see FIG. 11) yield or break, and the armrest face portion 162 deforms. Then, after a protruding distance toward the inside of the vehicle compartment has been reduced, the upper and lower impact absorbing pads 41, 42 efficiently absorb the impact against the passenger.

As described above, according to the present embodiment shown in FIGS. 10 through 13, there is provided the weak portion (see the first openings 164 . . . 164) formed at the armrest face portion 162 so as to deform due to the load applied to the armrest 160 in the vehicle width direction, and the separate armrest body 166 is attached to the armrest face portion 162 so as to cover the weak portion (see the first openings 164 . . . 164) at its side of the inside of the vehicle compartment.

Accordingly, the sufficient vertical-direction load resistance of the armrest in use can be obtained by rigidity of the trim body portion 161 and the support face portion 163. Further, since the weak portion (see the first openings 164 . . . 164) which deforms due to the vehicle-width-direction load is provided at the armrest face portion 162, the proper impact-absorption function can be obtained by the deformation of the weak portion (see the first openings 164 ... 164) during the vehicle side collision. Also, since the weak portion (see the first openings 164 ... 164) is covered by the separate armrest body 166 at the side of the vehicle compartment, good appearance when viewed from the inside of the vehicle compartment can be provided.

Also, the first openings 164 ... 164 are formed at the armrest face portion 162 so as to extend in the longitudinal direction of the vehicle. Namely, the above-described weak portion is configured of the first openings 164 ... 164.

Accordingly, strength of the armrest is properly adjusted and designed by the first openings 164 ... 164, and thus controlling the impact absorption function for the side-collision load can be facilitated, and a degree of the impact absorption can be increased by setting each opening area of the first openings 164 ... 164 properly.

Further, the first openings 164 ... 164 are configured of plural holes.

Accordingly, since the first openings 164 ... 164 are configured of plural holes, the adjustment of strength, particularly with respect to the impact load, can be facilitated.

Also, the armrest body 166 is configured so as to be detached from the weak portion (see the first openings 164 ... 164) when the load applied is greater than the specified load.

Accordingly, since the armrest body 166 is detached from the weak portion (see the first openings 164 ... 164) during the vehicle collision, the armrest face portion 162 can deform easily, thereby obtaining the proper impact absorption function.

In addition, the armrest 160 is formed at the door trim 140 of the side door (see front door 22) of the vehicle.

Accordingly, since the armrest structure according to the present invention is applied to the side door (see front door 22) of the vehicle which tends to be pushed into the vehicle compartment during the vehicle side collision, the impact absorption function can be attained preferably.

Also, there is provided the impact absorbing member (see the impact absorbing pad 41) at the outside of the trim body portion 161.

Accordingly, in the event that the armrest body 166 is detached from the weak portion (see the first openings 164 ... 164) due to the side vehicle collision and then the door trim 140 hits the passenger, an impact which may be applied to the passenger can be absorbed preferably by the impact absorbing member (see the impact absorbing pad 41).

Also, there is further provided the impact absorbing member (see the impact absorbing pad 42) at the outside of the support face portion 163.

Accordingly, since the impact absorbing members (see the impact absorbing pads 41, 42) are provided separately above and below the armrest face portion 162 of the armrest 160, the impact which may be applied to the passenger after the armrest body 166 is detached from the weak portion (see the first openings 164 ... 164) and the armrest face potion 162 deforms can be absorbed efficiently by the both absorbing members.

EMBODIMENT 3

Figure 14:
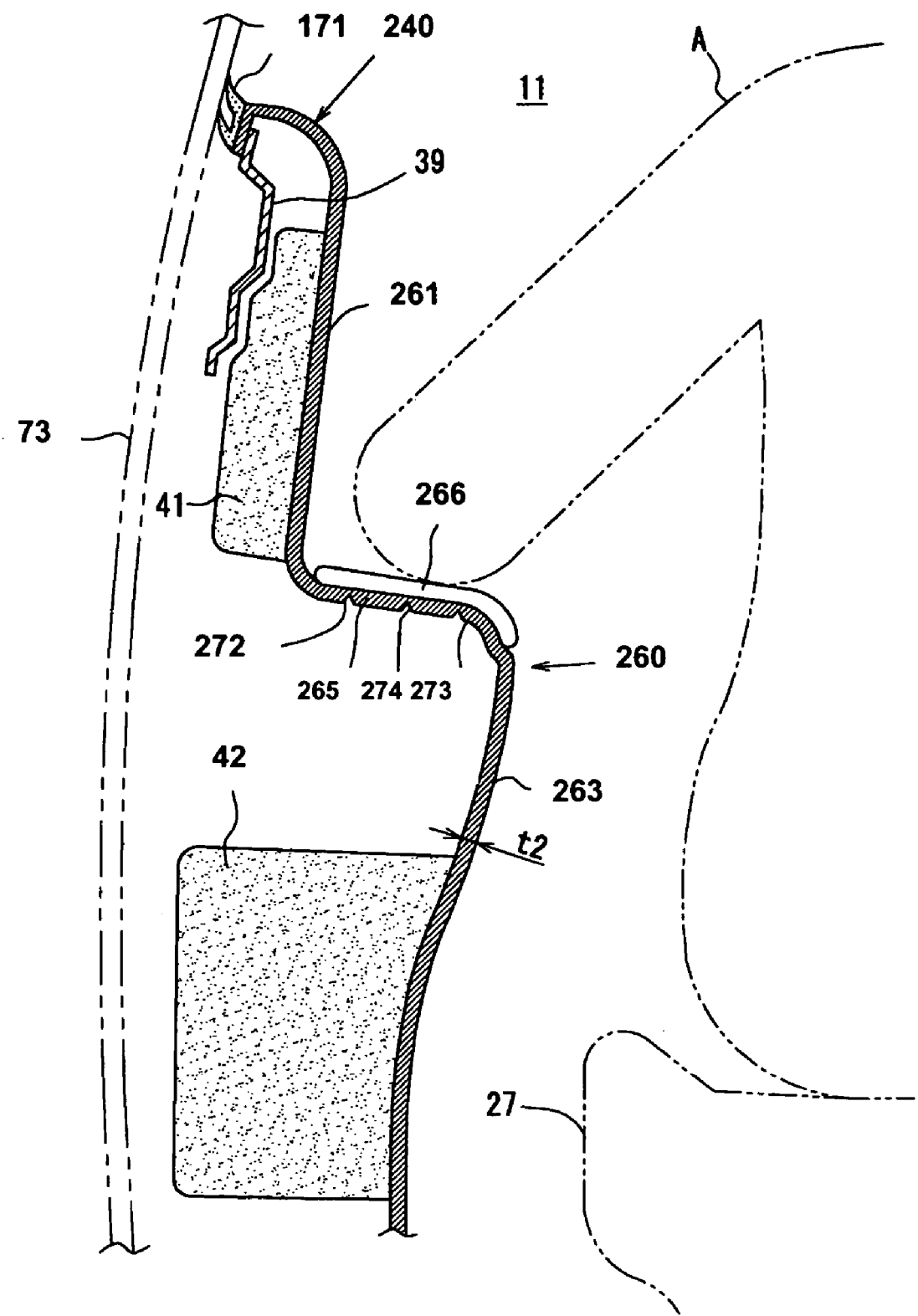
FIG. 14 is an elevation view showing an armrest structure for a vehicle according to a third embodiment of the present invention.

FIG. 14 illustrates a third embodiment of the present invention. Herein, the thickness t2 (see FIG. 14) of the door trim 240 of the present embodiment is set to be thicker than the thickness t1 (see FIG. 10) of the door trim 140 of the previous embodiment (t2>t1). Further, there are provided notch portions 272, 273, 274 at the bottom face of the connecting piece 265 remaining between the first openings 164 ... 164 (see FIG. 11), which are located at portions corresponding to the opening edge (end portions in the vehicle width direction) of the first openings 164 ... 164 and at the middle portion of the connecting piece 265 in the vehicle width direction. Other structures of the present embodiment illustrated in FIG. 14 are the same as those of the previous embodiment.

In the present embodiment, the load resistance of the armrest in use in the vertical direction can be further improved by the door trim 240 with the thickness of t2. Further, the rigidity with respect to the side-collision load in the vehicle width direction can be reduced certainly. Herein, such rigidity can be adjusted properly by setting the width and/or depth of the above-described notch portions 272, 273, 274.

EMBODIMENT 4

Figure 15:
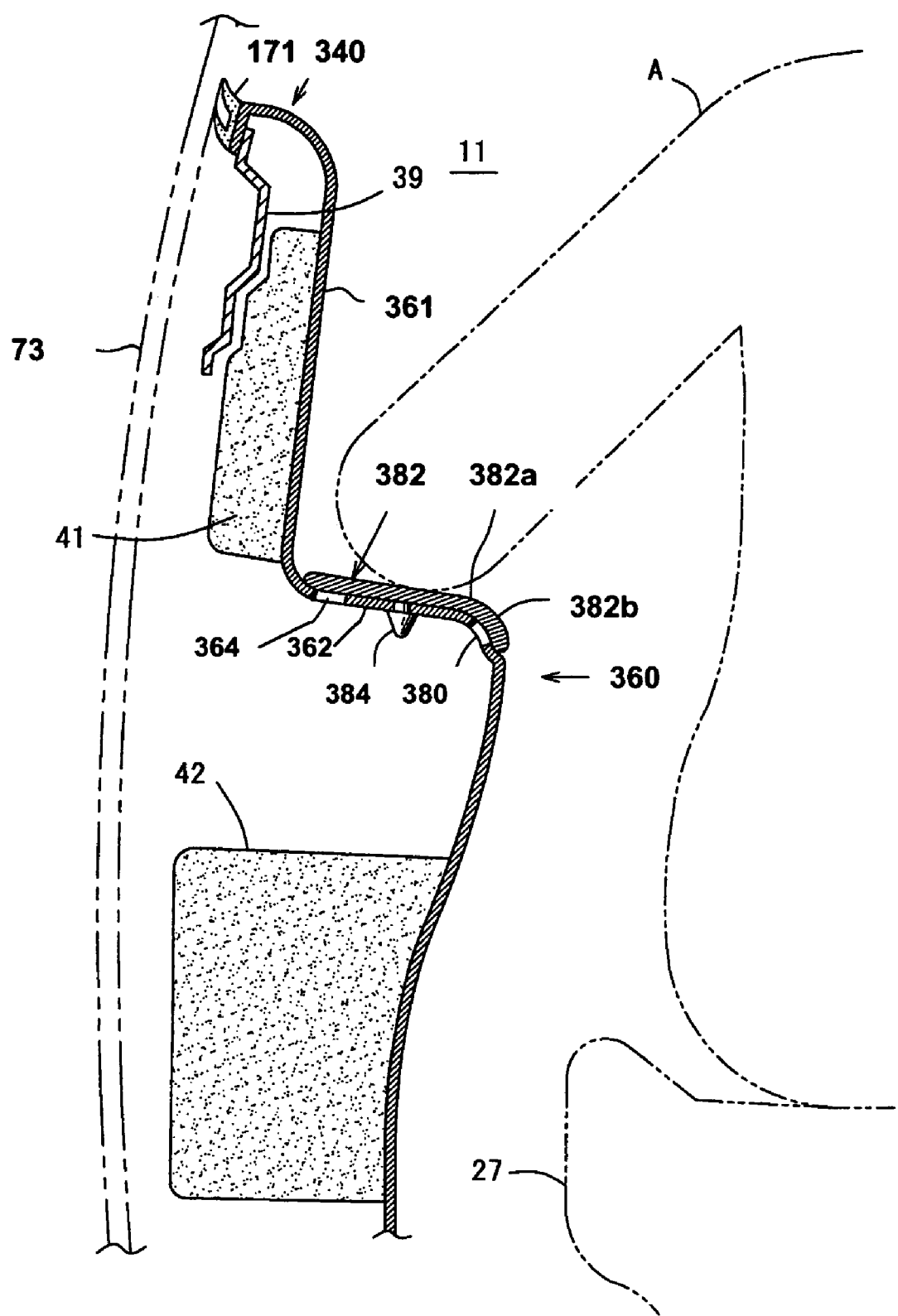
FIG. 15 is an elevation view showing an armrest structure for a vehicle according to a fourth embodiment of the present invention.
Figure 16:
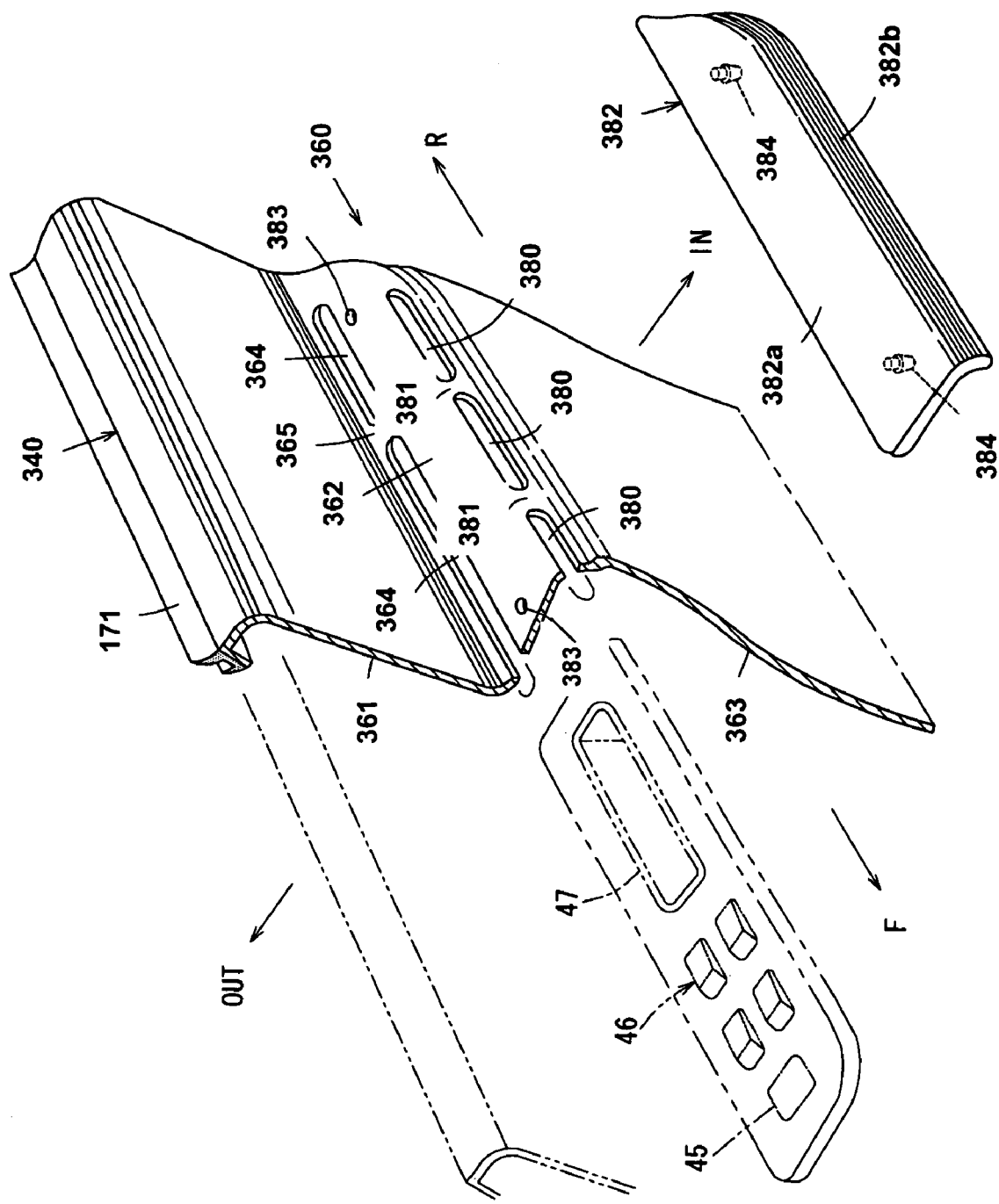
FIG. 16 is an exploded perspective view showing the armrest structure of FIG. 15.

FIGS. 15 and 16 illustrate an armrest structure for a vehicle according to a fourth embodiment of the present invention. In the present embodiment, first openings 364 ... 364 as a weak portion deforming due to the load in the vehicle width direction are formed at an armrest face portion 362 constituting an armrest 360 of a trim 340 so as to extend in the longitudinal direction, which is located at a side of a trim body portion 361. The first openings 364 ... 364 are formed of plural holes (two holes in the embodiment), and connecting pieces 365 ... 365 are formed so as to remain between the first openings 364 ... 364. Further, second openings 380 ... 380 as a weak portion deforming due to the load in the vehicle width direction are formed between the armrest face portion 362 and a support face portion 363 or at the support face portion 363 near the armrest face portion 362 so as to extend in the longitudinal direction, which is located at a side of a trim body portion 361. The second openings 380 ... 380 are formed of plural holes (two holes in the embodiment), and connecting pieces 381 ... 381 are formed so as to remain between the first openings 364 ... 364.

Further, there is provided an armrest body 382 separate from the door trim 340, which covers the above-described first and second openings 364 ... 364, 380 ... 380 at the same time and integrally. The armrest body 382 is disposed on the armrest face portion 362 so as to cover the side of the vehicle compartment 11, i.e., the upper face side of the first and second openings 364 ... 364, 380 ... 380 as weak portions.

The above-described armrest body 382 comprises a main portion 382a corresponding to the armrest face portion 362 and a skirt portion 382b covering the second openings 380 ... 380 which are formed integrally. There are provided engagement portions 384, 384 at the bottom face of the main body 382a which engage with attaching holes 383, 383 formed at around a middle portion in the vehicle width direction of the armrest face portion 362.

The engagement portion 384 may be comprised, as illustrated in FIG. 17(a), of a neck portion 384a and an engagement head portion 384b having a notch 384c with a reverse V shape. Also, it may be comprised, as illustrated in FIG. 17(b), of a support piece 384d and plural sprit resilient pieces 384e ... 384e which respectively engage with the opening edges of the attaching holes 383, 383, which are formed integrally. The armrest body 382 attached to the armrest face portion 362 by inserting the engagement portions 384, 384 into the attaching holes 383, 383 is detached from the first and second openings 364 ... 364, 380 ... 380 as weak portions (i.e., the armrest face portion 362) by the load (side-collision load) applied in the vehicle width direction which is greater than the specified load.

Figure 17:
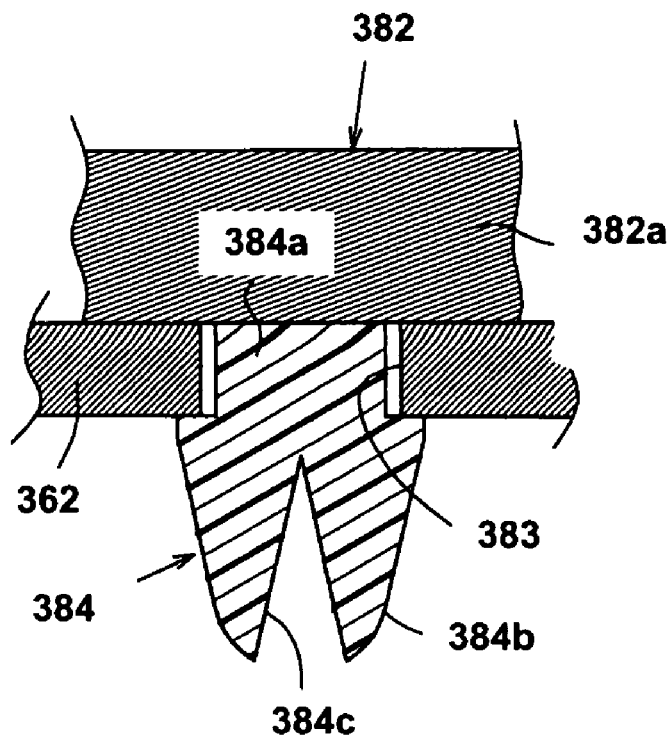
FIG. 17($a$) and FIG. 17($b$) are sectional views showing respectively a relative structure between an attaching hole and an engagement portion.
Figure 17:
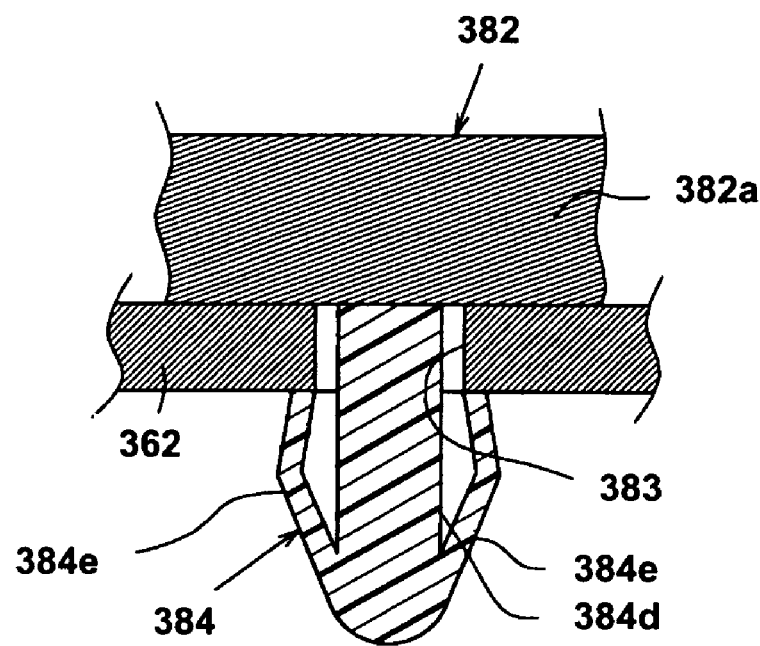

As described above, according to the present embodiment shown in FIGS. 15 through 17, there is provided the armrest structure for the vehicle, in which the armrest 360 is disposed so as to protrude and extend toward the passenger A from the inside wall of the vehicle compartment 11, comprising the trim body portion 361 covering the inside wall of the vehicle compartment 11, the armrest face portion 362 extending in the substantially horizontal direction from the trim body portion 361 toward the inside of the vehicle compartment 11, the support face portion 363 extending continuously from the armrest face portion 362 downward, and the weak portion (see the second openings 380 . . . 380) which is provided between the armrest face portion 362 and the support face portion 363 or at the support face portion 363 so as to deform due to the load applied in the vehicle width direction. And further, there is provided on the armrest face portion 362 the separate armrest body 382 covering the above-described weak portion (see the second openings 380 . . . 380) from the inside of the vehicle compartment 11.

Accordingly, the sufficient vertical-direction load resistance of the armrest in use can be obtained by rigidity of the trim body portion 361 and the support face portion 363. Further, since the weak portion (see the second openings 380 . . . 380) which deforms due to the vehicle-width-direction load is provided between the armrest face portion 362 and the support face portion 363 or at the support face portion 363, the proper impact-absorption function can be obtained by the deformation of the weak portion (see the second openings 380 . . . 380) during the vehicle side collision. Also, since the weak portion (see the second openings 380 . . . 380) is covered by the separate armrest body 382 at the side of the vehicle compartment, the good appearance when viewed from the inside of the vehicle compartment can be provided.

Further, in the event that the second openings 380 . . . 380 are formed between the armrest face portion 362 and the support face portion 363 so as to extend in the longitudinal direction of the vehicle in addition to the first openings 364 . . . 364 as weak portions, the rigidity in the vehicle width direction can be further decreased. As a result, the armrest face portion 362 can be configured so as to yield easily to the side-collision load, thereby improving the impact absorption function.

Also, in the event that the second openings 380 . . . 380 are configured of plural holes, the adjustment of strength, particularly with respect to the impact load, can be facilitated.

EMBODIMENT 5

An armrest structure for a vehicle according to a fifth embodiment will be described referring to FIGS. 18 and 19.

The above-described door trim 440 is provided with an armrest 460 formed integrally with the door trim 440 which protrudes and extends toward the passenger A from the inside wall (door inner panel 439 of the front door 22 in the embodiment) of the vehicle compartment 11.

The armrest 460 comprises a trim body portion 461 (upper portion of the door trim 140) which covers the inside wall (see door inner panel 439) of the vehicle compartment, an armrest face portion 462 for armrest of the passenger A which extends in the substantially horizontal direction from the trim body portion 461 toward the inside of the vehicle compartment 11 by a specified length (a necessary length for passengers to put their arms), and a support face portion 463 which extends continuously from the armrest face portion 462 downward.

The above-described trim body portion 461 constitutes a door trim upper of the trim, which is provided with an tongue piece 461a and a bent portion 461b at both ends thereof which are made of synthetic resins or the like and integrated therewith. Namely, there are provided the tongue piece 461a which is located at outside extending downward from an upper end of the trim body portion 461 by a specified length for attaching a weather strip seal 464 and the bent portion 461b extending toward outside of the vehicle from a lower end of the trim body portion 461 by a specified length. These tongue piece 461a and bent portion 461b extend respectively in the longitudinal direction of the vehicle.

Also, the above-described armrest face portion 462 and support face portion 463 constitute a door trim lower of the trim. Herein, the door trim upper 462 and the door trim lower 463 are formed separately.

Further, an inside of the trim body portion 461 is covered by an outer layer member 465 to provide an improved appearance from the inside of the vehicle compartment. The outer layer member 465 may be made from lather, cloth, grained resin such as vinyl, or the like, depending upon vehicle model's grades. The armrest face portion 462 is disposed below the trim body portion 461, and these portions 461b, 462 are connected integrally by the use of plural clips 466 . . . 466 as connecting members, contacting the bent portion 461b of the trim body portion 461 with an outside send portion of the armrest face portion 462 via the outer layer member 465.

The above-described clips 466 . . . 466 are made from metal such as iron, which are disposed in the longitudinal direction at regular or irregular intervals to fix the both portions 461b, 462. These clips 466 . . . 466 are also configured so as to be disengaged to allow the trim body portion 461 and the armrest face portion 462 to be disconnected from each other when a load greater than a specified load in the vehicle width direction is applied thereto. Namely, it is configured that the trim body portion 461 and the armrest face portion 462, which are formed separately, are connected integrally by the clips 466 . . . 466 in their normal state, while they are disconnected from each other because the clips 466 . . . 466 are disengaged due to the lateral load from the side of the vehicle. In order to attain the above-described configuration, each of the clips 466 . . . 466 is U-shaped, and has a relatively large gripping force in the vertical direction, while it has a relatively small gripping force in the vehicle width direction.

Figure 18:
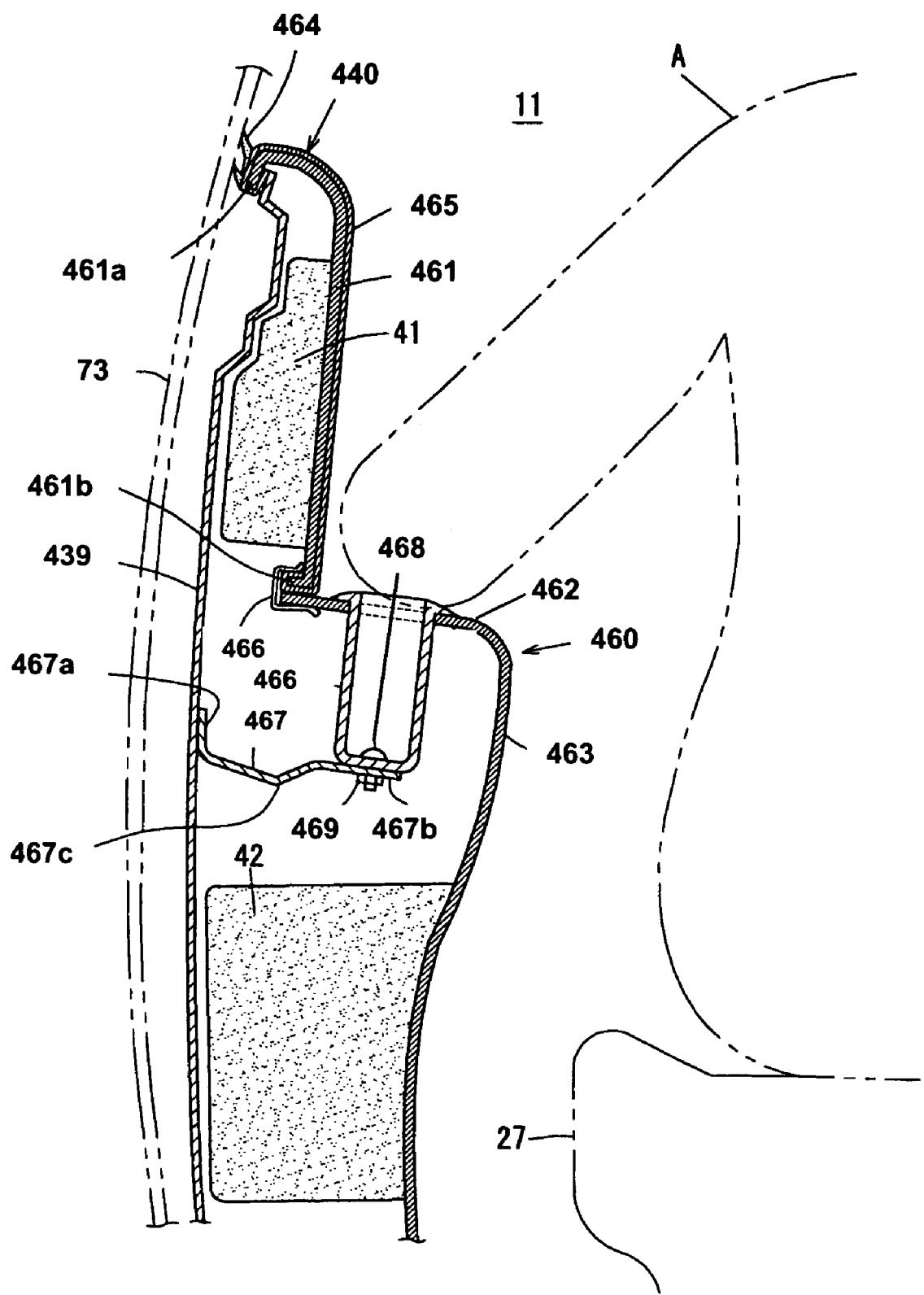
FIG. 18 is an elevation view of a major part showing an armrest structure for a vehicle according to a fifth embodiment of the present invention.
Figure 19:
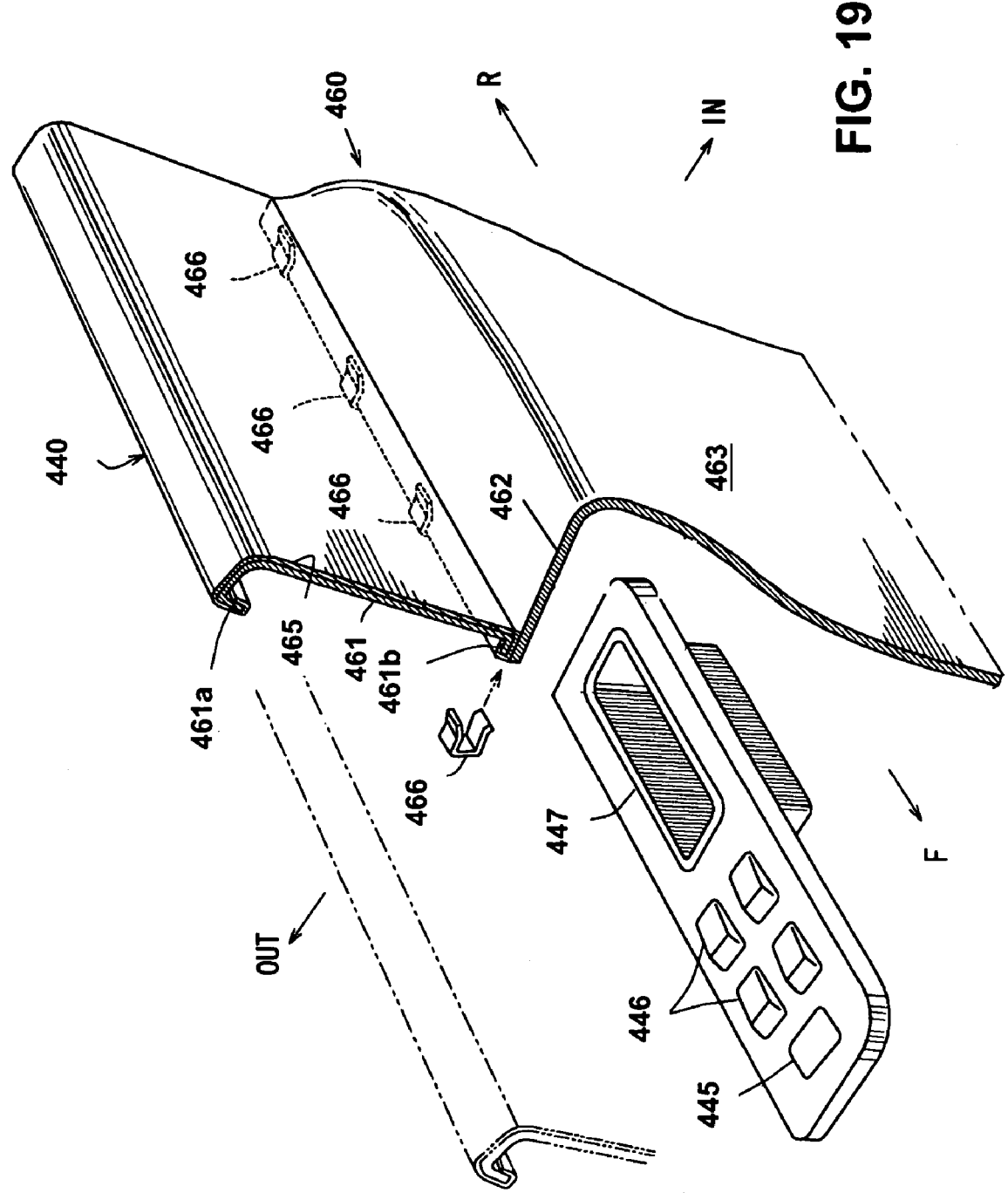
FIG. 19 is a perspective view of the major part of FIG. 18.

Herein, the above-described mirror switch portion 445, power window switch 446 and recess member 447 are provided before the armrest face portion 462 of the armrest 460 as illustrated in FIG. 19. As illustrated in FIG. 18, the upper impact absorbing pad 41 is provided outside of the trim body portion 461 and the lower impact absorbing pad 42 is provided outside of the support face portion 463.

The recess member 447 is disposed at the armrest face portion 462 as illustrated in FIGS. 18 and 19, and there is provided, as illustrated in FIG. 18, a support bracket 467 made of metal as an impact absorbing member between the recess member 447 disposed at the armrest face portion 462 and the door inner panel 439 as an example of a vehicle body. The support bracket 467 is welded to the door inner panel 439 at its vehicle-outside end portion 467a, and it is connected to a bottom face of the recess member 447 by an attaching member comprised of a screw 468 and a nut 469 at its recess-side end portion 467b. Also, a deformation promoting portion 467c is formed at a middle portion of the support bracket 467 in the vehicle width direction, and the support bracket 467 is made of a metal plate so as to deform at the deformation promoting portion 467c due to the width-direction load grater than the specified load. The metal support bracket 467 can be configured so as to provide preferable impact absorbing function by selecting properly a thickness and/or a longitudinal-direction length thereof.

Figure 20:
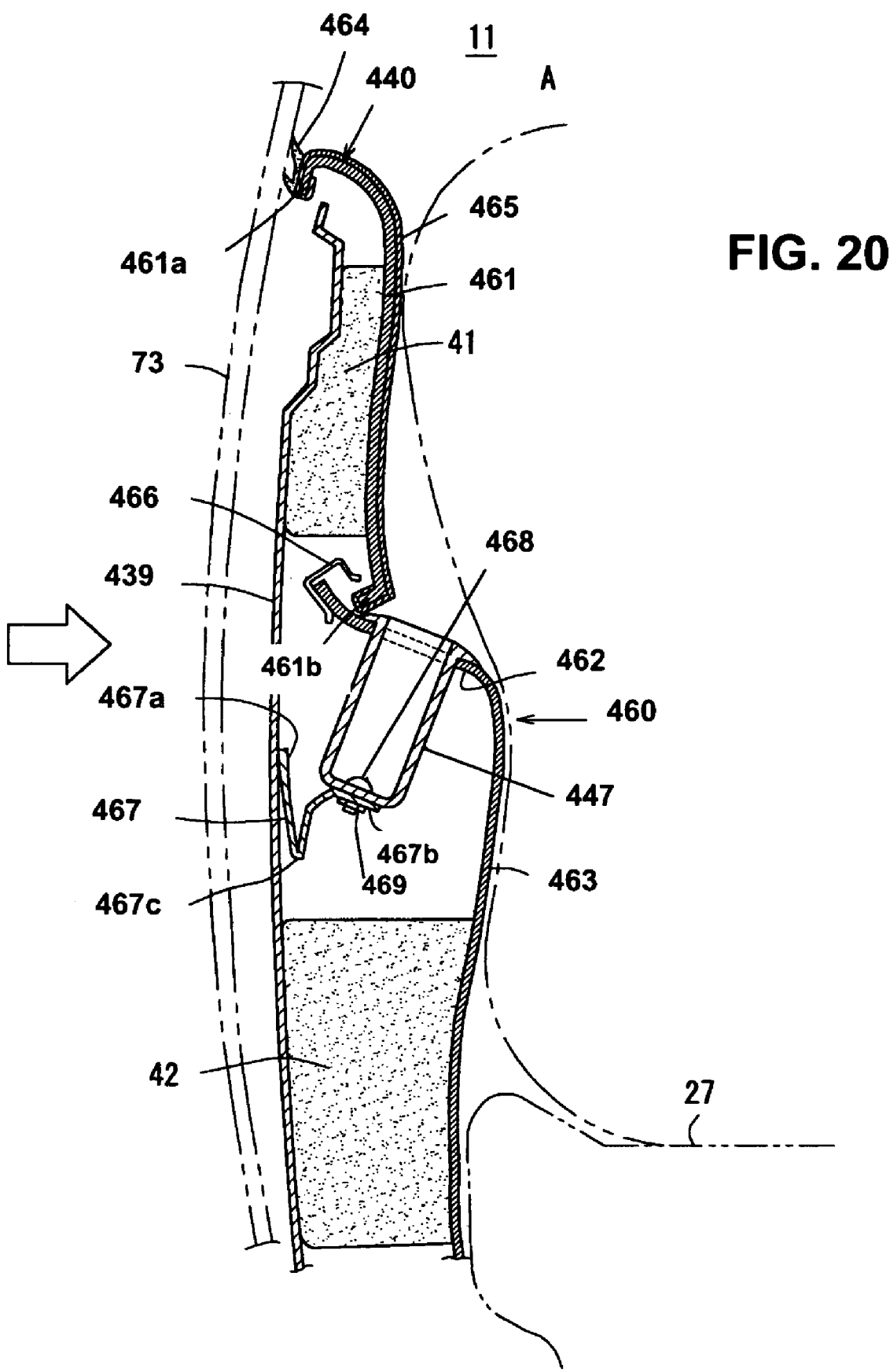
FIG. 20 is an explanatory diagram showing a deformation state of an armrest during the vehicle side collision.

The armrest 460 with the above-described structure has sufficient rigidity (load resistance) in the vertical direction, and thus it has a load resistance to support the arm of the passenger A putting on the armrest face portion 462. Further, the trim body portion 461 and the armrest face portion 462 are disconnected from each other due to the lateral load (side-collision load). Accordingly, when the vehicle side collision occurs, firstly the front door 22 is moved toward inside and the door trim 440 hits the passenger A as illustrated in FIG. 20 from its original state shown in FIG. 18. Subsequently, the clips 466 . . . 466 are disengaged, and the trim body portion 461 and the armrest face portion 462 are disconnected from each other. The support bracket 467 yields and deforms at the deformation promoting portion 467c, absorbing an impact energy. Then, after a protruding distance toward the inside of the vehicle compartment of the armrest face portion 462 has been reduced, the upper and lower impact absorbing pads 41, 42 efficiently absorb the impact against the passenger.

As described above, according to the present embodiment shown in FIGS. 18 through 20, there is provided the armrest structure for the vehicle, in which the armrest 460 is disposed so as to protrude and extend toward the passenger A from the inside wall of the vehicle compartment 11, comprising the trim body portion 461 covering the inside wall (see door inner panel 439) of the vehicle compartment 11, the armrest face portion 462 extending in the substantially horizontal direction from the trim body portion 461 toward the inside of the vehicle compartment 11, the support face portion 463 extending continuously from the armrest face portion 462 downward, and the trim body portion 461 and the armrest face portion 462 are configured so as to be disconnected from each other by the load (side-collision load) applied to the armrest in the vehicle width direction.

Accordingly, the sufficient vertical-direction load resistance of the armrest 460 in use can be obtained by rigidity of the trim body portion 461 and the support face portion 463. Further, since the trim body portion 461 and the armrest face portion 462 are disconnected by the load from the side, i.e., the side-collision load, the proper impact-absorption function can be obtained during the vehicle side collision. Namely, both the sufficient resistance for the load applied to the armrest 460 in the vertical direction and the proper impact-absorption function during the vehicle collision can be obtained.

Also, the trim body portion 461 and the armrest face portion 462, which are formed separately, are configured so as to be usually connected integrally and disconnected according to the load applied.

Accordingly, since the trim body portion 461 and the armrest face portion 462 are formed separately and they are configured so as to be disconnected according to the load applied, the disconnection of the both during the vehicle side collision can be made smooth.

Further, the trim body portion 461 and the armrest face portion 462 are connected to each other by a connecting member (see clips 466 . . . 466).

Accordingly, the trim body portion 461 and the armrest face portion 462 are normally connected integrally by the connecting member (see clips 466 . . . 466), while they are disconnected by a release of a connecting force of the connecting member during the vehicle side collision.

In addition, the connecting member (see clips 466 . . . 466) is configured so as to allow the trim body portion 461 and the armrest face portion 462 to be disconnected when the load applied is greater than the specified load.

Accordingly, since the connecting member (see clips 466 . . . 466) allows both portions to be disconnected with the greater load than the specified load which occurs during the vehicle side collision, the armrest face potion 462 can be disconnected easily.

Also, there is provided the impact absorbing member (see the support bracket 467) between the armrest face portion 462 and the vehicle body (see the door inner panel 439).

Accordingly, the impact can be properly absorbed by deformation of the impact absorbing member (see the support bracket 467).

Also, there is provided the recess member 447 at the armrest face portion 462, and the recess member 447 and the vehicle body (see the door inner panel 439) are connected by the support bracket 467. Namely, the above-described impact absorbing member is configured of the support bracket 467.

Accordingly, the supporting rigidity of the recess member 447 can be improved by the supporting bracket 467, and thus the recess member 447 can properly sustain the load applied to the recess member, for example, from the passenger or when the front door 22 is opened or closed.

Further, the support bracket 467 is configured so as to be deformed (at the deformation promoting portion 467c in the present embodiment) when the load applied is greater than the specified load.

Accordingly, both the proper impact-load absorption during the vehicle side collision and the sufficient supporting rigidity of the recess member 447 in the normal state can be obtained.

In addition, the armrest 460 is formed at the door trim 440 of the side door (see the front door 22) of the vehicle.

Accordingly, since the armrest structure according to the present invention is applied to the side door (see the front door 22) of the vehicle which tends to be pushed into the vehicle compartment during the vehicle side collision, the impact absorption function can be attained preferably.

Also, there is provided the impact absorbing pad 41 at an outside of the trim body portion 461.

Accordingly, the impact applied to the passenger A can be absorbed preferably by the impact absorbing pad 41 during the vehicle side collision.

Further, there is further provided the impact absorbing pad 42 at the outside of the support face portion 463.

Accordingly, since impact absorbing pads 41, 42 are provided separately above and below the armrest face portion 462 of the armrest 460, the impact applied to the passenger A can be absorbed efficiently by the both absorbing pads 41, 42 during the vehicle side collision.

EMBODIMENT 6

Figure 21:
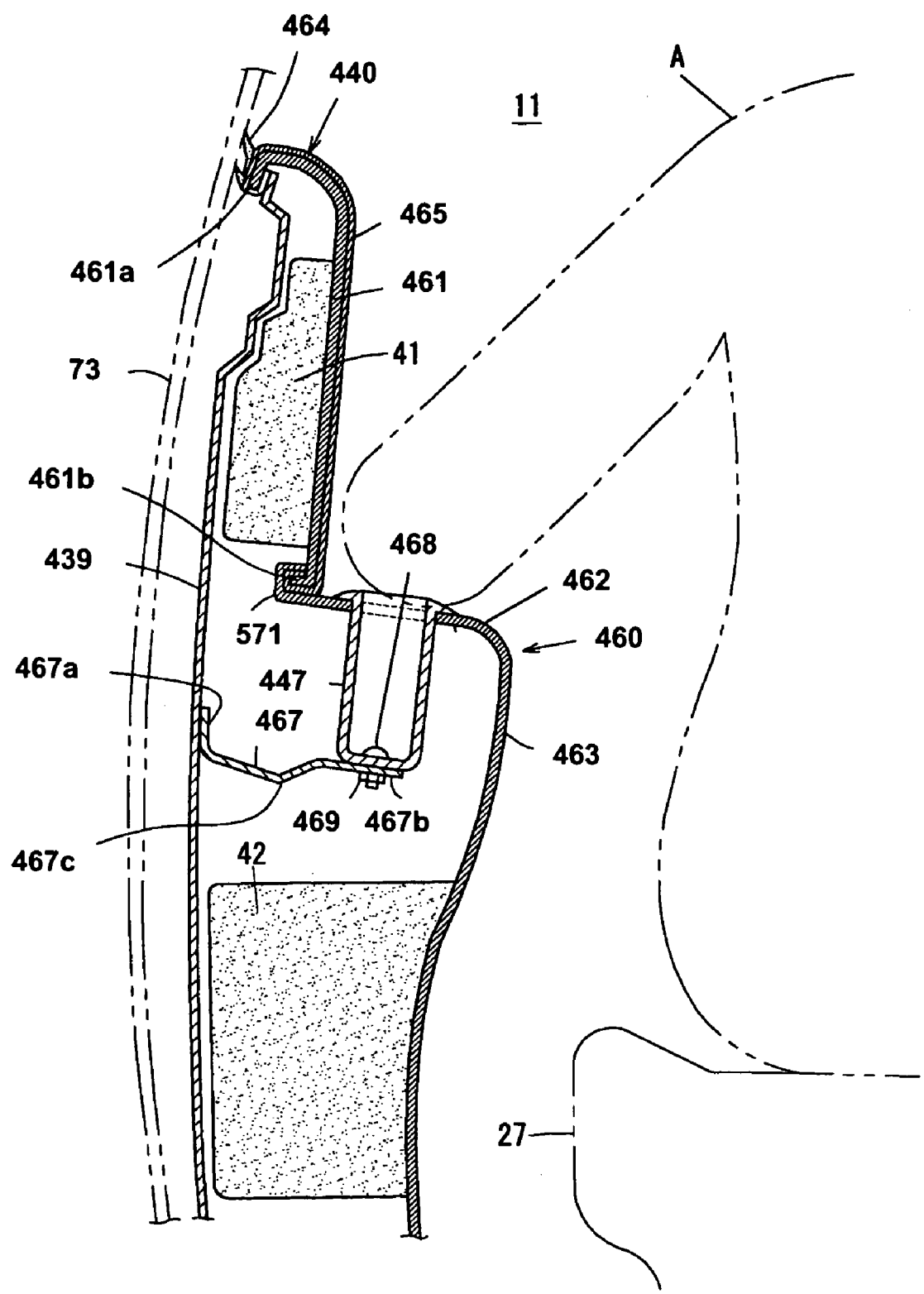
FIG. 21 is an elevation view showing an armrest structure for a vehicle according to a sixth embodiment of the present invention.
Figure 22:
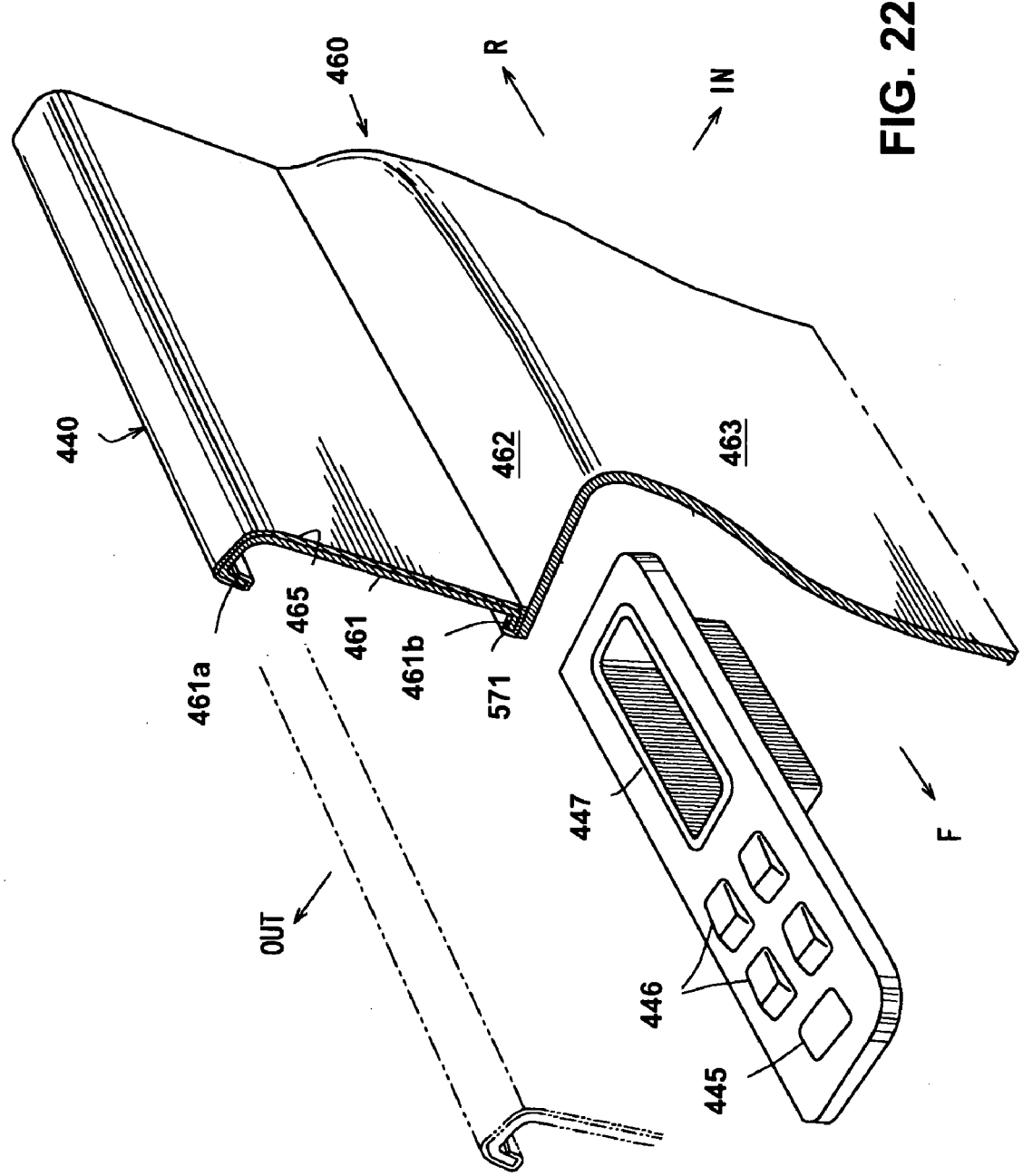
FIG. 22 is a perspective view of a major part of FIG. 21.
Figure 23:
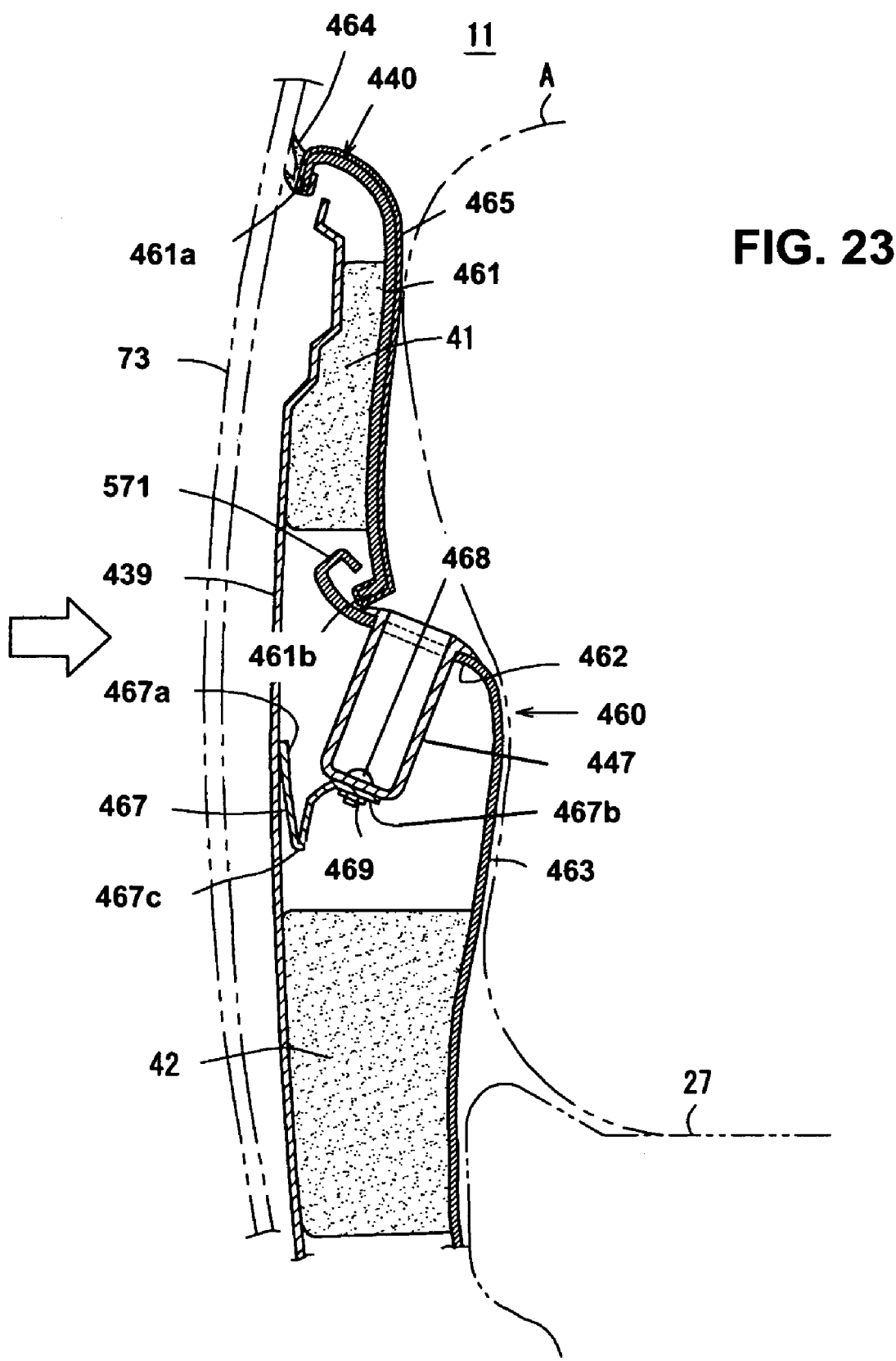
FIG. 23 is an explanatory diagram showing a deformation state of an armrest during the vehicle side collision.
Figure 24:
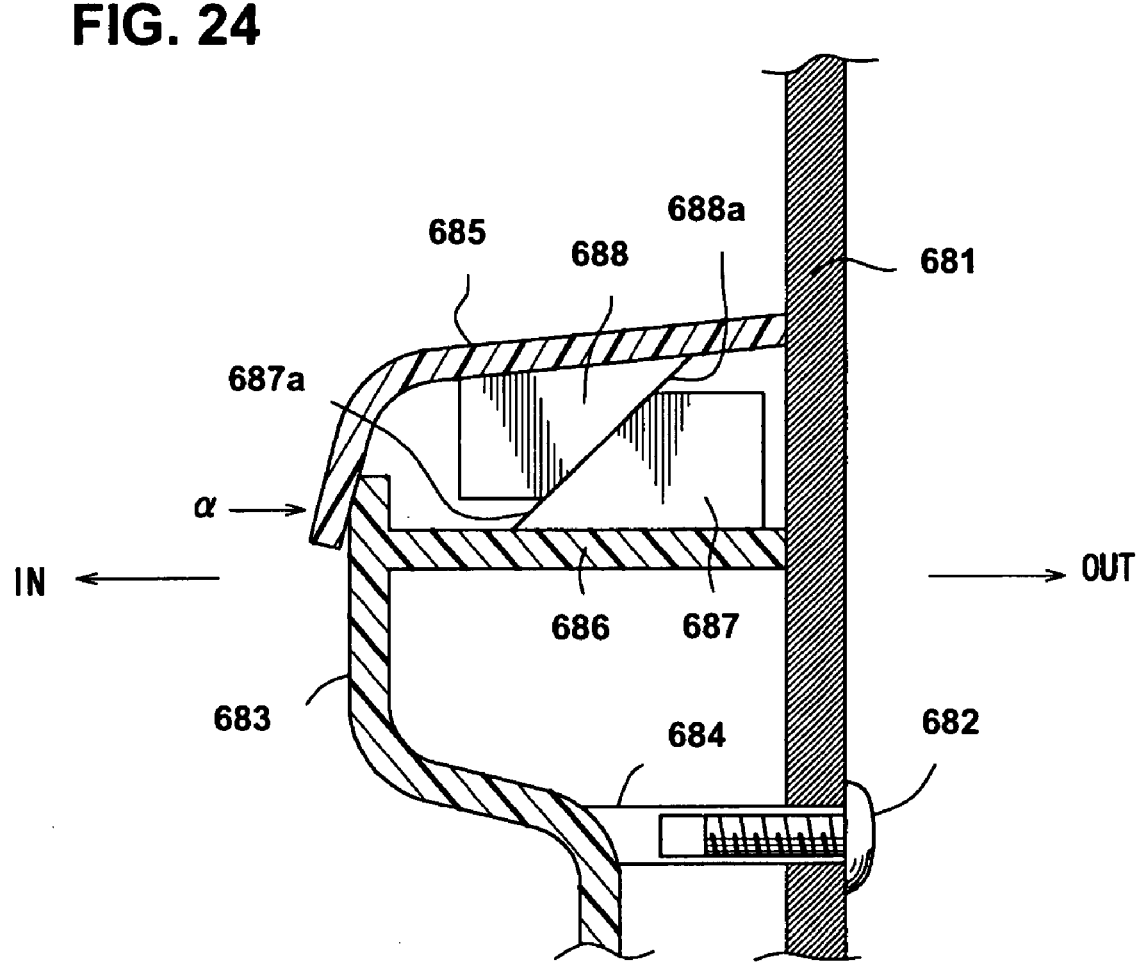
FIG. 24 is a sectional view showing a conventional armrest structure.
Figure 25:
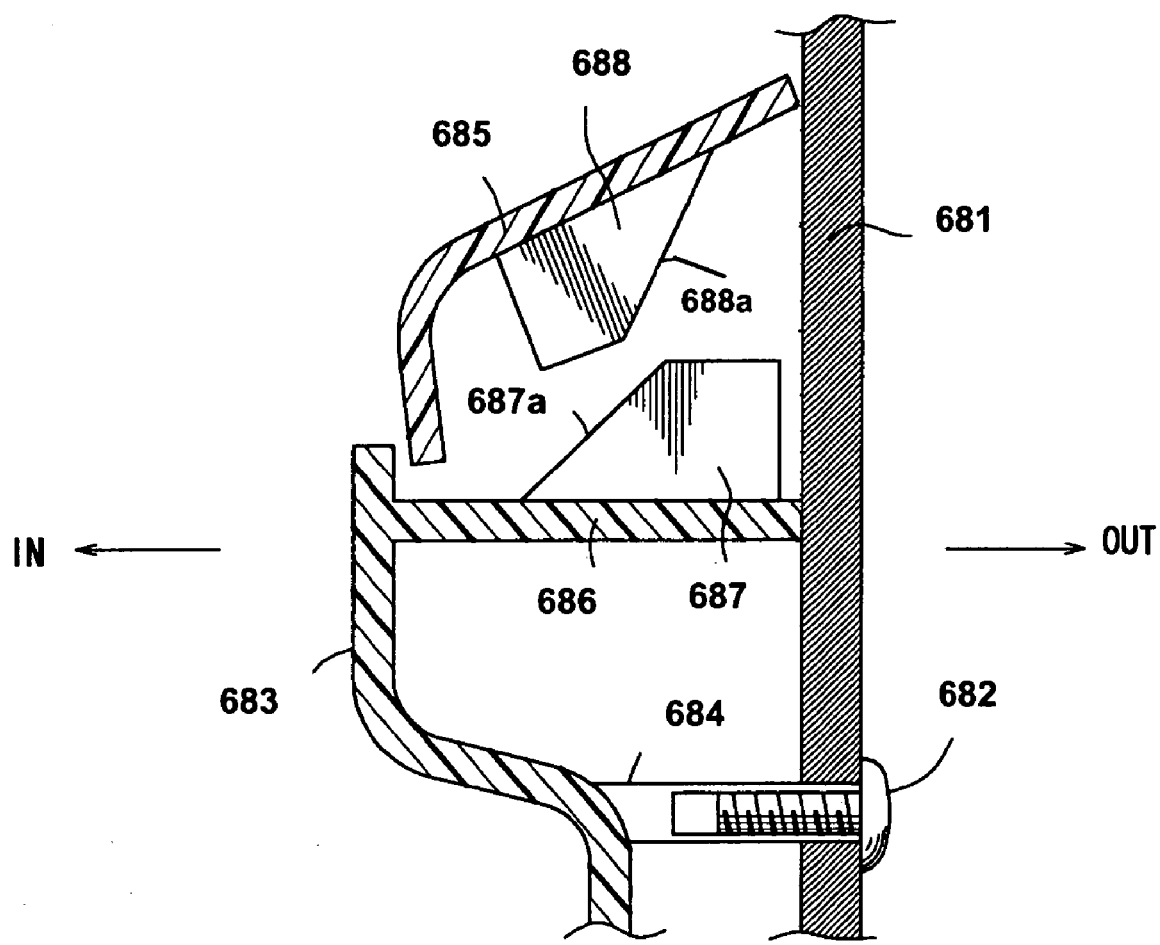
FIG. 25 is a sectional view showing a deformation state of an armrest of FIG. 24.
Figure 26:
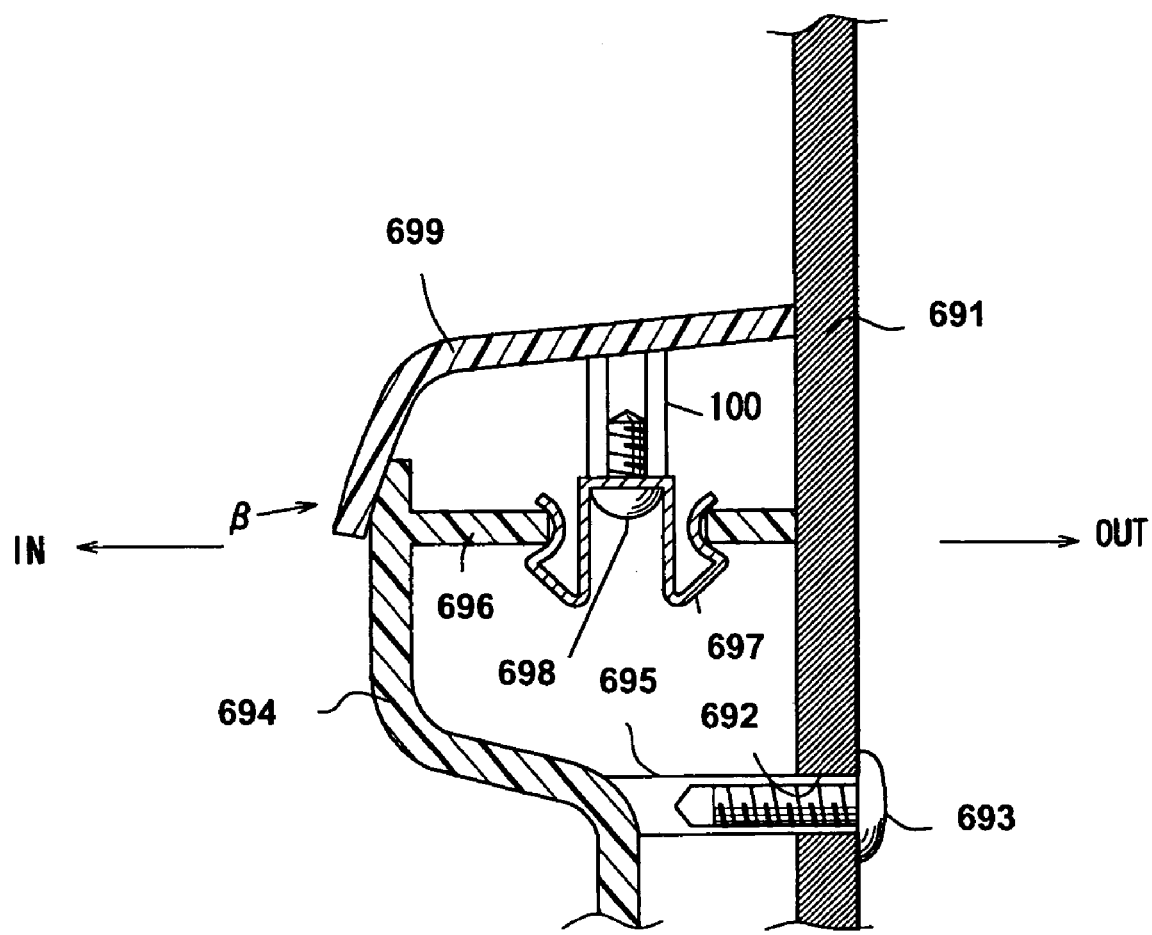
FIG. 26 is a sectional view showing a conventional armrest structure.

FIGS. 21 through 23 illustrate an armrest structure for a vehicle according to a sixth embodiment of the present invention. In the present embodiment, instead of using the clips 466 . . . 466 as the connecting members in the previous embodiment, the armrest face portion 462 constituting the door trim lower includes a connecting portion 571 with a U-shaped cross section which is formed integrally therewith at its vehicle-outside end portion, and the connecting portion 571 is engaged with the above-described bent portion 461b of the trim body portion 461 in such a manner that the bent portion 461b is inserted into a space within the connecting portion 571.

The above-described connecting portion 571 may be formed as a single piece which extends continuously in the longitudinal direction of the vehicle, or formed partially as plural pieces at regular or irregular intervals.

Since the armrest 460 of FIGS. 21 through 23 also has the sufficient rigidity in the vertical direction, it has the load resistance to support the arm of the passenger A putting on the armrest face portion 462. Further, since the trim body portion 461 and the armrest face portion 462 are disconnected from each other due to the lateral load (side-collision load), when the vehicle side collision occurs, firstly the front door 22 is moved toward inside and the door trim 440 hits the passenger A as illustrated in FIG. 23 from its original state shown in FIG. 21. Subsequently, the connecting portion 571 is disengaged to allow the trim body portion 461 and the armrest face portion 462 are disconnected from each other. The support bracket 467 yields and deforms at the deformation promoting portion 467c, absorbing an impact energy. Then, after a protruding distance toward the inside of the vehicle compartment of the armrest face portion 462 has been reduced, the upper and lower impact absorbing pads 41, 42 efficiently absorb the impact against the passenger.

As described above, since the embodiment of FIGS. 21 through 23 has the same structure, function and effects as the previous fifth embodiment of FIGS. 18 through 20 except for the above-described connecting portion 571, detailed descriptions of such same parts is omitted here by putting the same reference numerals on them in FIGS. 21 through 23.

Herein, corresponding relationships between the present invention and the embodiments described above will be as follows.

In the first embodiment, the weak portion corresponds to the openings 64, 69, the side door corresponds to the front door 22, and the impact absorbing member corresponds to the impact absorbing pads 41, 42. In the second through fourth embodiments, the weak portion corresponds to the first opening 164 and/or the second opening 380. In the fifth and sixth embodiments, the connecting member corresponds to the clip 466 and the impact absorbing member corresponds to the support bracket 467.

Herein, the present invention should not limited by the above-described embodiments. For example, the armrest structure according to the present invention may be applied to not only the front door 22 but also a rear door.

What is claimed is:

1. An armrest structure for a vehicle, in which an armrest is disposed so as to protrude and extend toward a passenger from an inside wall of a vehicle compartment, comprising:
   a trim body portion covering the inside wall of the vehicle compartment;
   an armrest face portion extending in a substantially horizontal direction from said trim body portion toward an inside of the vehicle compartment, the armrest face portion being a portion on which a passenger's arm is directly placed;
   a support face portion extending continuously from said armrest face portion downward, wherein said trim body portion, armrest face portion and support face portion being formed integrally;
   an opening which is formed at the armrest between said trim body portion and said armrest face portion so as to promote a deformation of the armrest with respect to a load which is applied to the armrest in a vehicle width direction; and
   a garnish covering said opening from the inside of the vehicle compartment, the garnish comprising a base portion, an engagement portion to engage with an opening edge of said opening and a connecting portion to connect the base portion with the engagement portion, the garnish being configured so as to be detached from said opening of the armrest when said load applied is greater than a specified load with an engagement control between the engagement portion and the opening edge of the opening.

2. The armrest structure for a vehicle of claim 1, wherein said opening opening extends in a longitudinal direction of the vehicle, and said garnish is provided so as to extend along said opening and cover the opening.

3. The armrest structure for a vehicle of claim 1, wherein there is further provided an onening to promote the deformation of the armrest with respect to said load at part of said support face portion of the armrest, and there is provided another garnish covering said opening from the inside of the vehicle compartment.

4. The armrest structure for a vehicle of claim 3, wherein said opening provided at the support face portion extends in a longitudinal direction of the vehicle, and said garnish is provided so as to extend along said opening and cover the opening.

5. The armrest structure for a vehicle of claim 3, wherein said garnish provided on the support face portion is configured so as to be detached from said weak portion provided at the support face portion when said load applied is greater than a specified load.

6. The armrest structure for a vehicle of claim 1, wherein said armrest is formed at a door trim of a side door of the vehicle.

7. The armrest structure for a vehicle of claim 6, wherein there is provided an impact absorbing member at an outside of said trim body portion.

8. The armrest structure for a vehicle of claim 7, wherein there is further provided an impact absorbing member at an outside of said support face portion.

9. An armrest structure for a vehicle, in which an armrest is disposed so as to protrude and extend toward a passenger from an inside wall of a vehicle compartment, comprising:
   a trim body portion covering the inside wall of the vehicle compartment;
   an armrest face portion extending in a substantially horizontal direction from said trim body portion toward an inside of the vehicle compartment, the armrest face portion being a portion on which a passenger's arm is directly placed;
   a support face portion extending continuously from said armrest face portion downward, wherein said trim body portion, armrest face portion and support face portion being formed integrally;
   a first opening which is formed at the armrest between said trim body portion and said armrest face portion so as to promote a deformation of the armrest with respect to a load which is applied to the armrest in a vehicle width direction;
   a first garnish covering said first opening from the inside of the vehicle compartment, the garnish being configured so as to be detached from said first opening of the armrest when said load applied is greater than a specified load;
   a second opening which is formed at part of said support thee portion of the armrest so as to promote the deformation of the armrest with respect to said load; and
   a second garnish covering said second opening from the inside of the vehicle compartment, the garnish being configured so as to be detached from said second opening of the armrest when said load applied is greater than a specified load.

* * * * *